(12) United States Patent
Naruishi et al.

(10) Patent No.: US 8,307,775 B2
(45) Date of Patent: Nov. 13, 2012

(54) IMPACT DETECTOR AND PACKAGING CONTAINER

(75) Inventors: Moku Naruishi, Kawasaki (JP); Sakae Ishikawa, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 277 days.

(21) Appl. No.: 12/662,730

(22) Filed: Apr. 30, 2010

(65) Prior Publication Data

US 2010/0281946 A1 Nov. 11, 2010

(30) Foreign Application Priority Data

May 8, 2009 (JP) ................................ 2009-113387
Sep. 7, 2009 (JP) ................................ 2009-205545
Oct. 19, 2009 (JP) ................................ 2009-240254

(51) Int. Cl.
*G01L 5/00* (2006.01)
*G01N 3/30* (2006.01)

(52) U.S. Cl. ...... 116/203; 116/200; 73/12.06; 73/12.09; 73/12.13

(58) Field of Classification Search .................. 116/200, 116/202, 203, 204, 211, 267, 276; 73/12.01–12.05, 73/12.09, 12.13
See application file for complete search history.

(56) References Cited

U.S. PATENT DOCUMENTS

| | | | | |
|---|---|---|---|---|
| 3,373,716 A | * | 3/1968 | Williams | 116/203 |
| 3,909,568 A | * | 9/1975 | Greenhut | 116/203 |
| 3,921,463 A | * | 11/1975 | Robbins | 116/203 |
| 4,060,004 A | * | 11/1977 | Scholz et al. | 116/203 |
| 4,068,613 A | * | 1/1978 | Rubey | 116/203 |
| 4,237,736 A | * | 12/1980 | Wright | 73/492 |
| 4,361,106 A | * | 11/1982 | Eklof | 116/203 |
| 4,470,302 A | * | 9/1984 | Carte | 116/203 |
| 8,074,489 B2 | * | 12/2011 | Ishikawa et al. | 73/12.04 |
| 2009/0249858 A1 | * | 10/2009 | Ishikawa et al. | 73/12.06 |
| 2010/0050733 A1 | * | 3/2010 | Naruishi | 73/12.06 |
| 2010/0180457 A1 | * | 7/2010 | Katoh et al. | 116/203 |
| 2010/0300178 A1 | * | 12/2010 | Naruishi et al. | 73/12.06 |

FOREIGN PATENT DOCUMENTS

| | | |
|---|---|---|
| JP | 2001-108703 | 4/2001 |
| JP | 2001-199475 | 7/2001 |
| JP | 2009-156726 | 7/2009 |

OTHER PUBLICATIONS

Catalog of Drop Sign by Noppon Kako-Kizai Co., Ltd., http://www.nk-kizai.co.jp/ENG/item/Drop.html, 2004.

* cited by examiner

*Primary Examiner* — Lisa Caputo
*Assistant Examiner* — Jonathan Dunlap
(74) *Attorney, Agent, or Firm* — Harness, Dickey & Pierce, P.L.C.

(57) ABSTRACT

An impact detector includes a circular weight, a case containing the weight, in which a transition path for the weight is formed, a planar elastic member extending in the case with a first end oriented in a direction in which the weight move upon an impact in a first direction, a fixing member fixing the planar member to the case. The planar elastic member includes a folded portion disposed on a second end of the planar elastic member, and a first arm and a second arm both extending from the folded portion. An end portion of the first arm holds the weight at an initial position, and the first arm deforms to release the weight upon the impact in the first direction. The fixing member includes a sandwiching portion sandwiching the folded portion and a contact portion in contact with both the first arm and the second arm.

20 Claims, 20 Drawing Sheets

FIG. 1A
RELATED ART
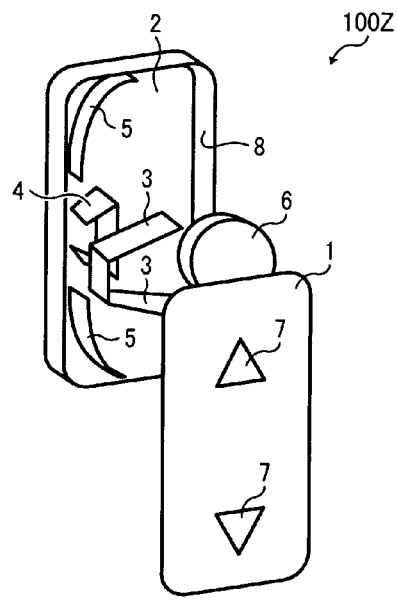
| FIG. 1B | FIG. 1C | FIG. 1D | FIG. 1E |
|---|---|---|---|
| RELATED ART | RELATED ART | RELATED ART | RELATED ART |
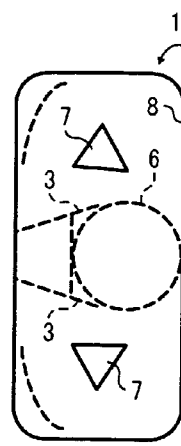 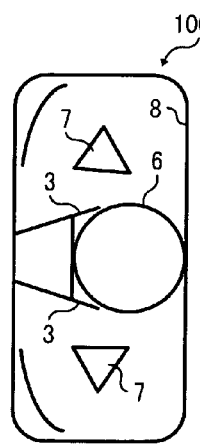 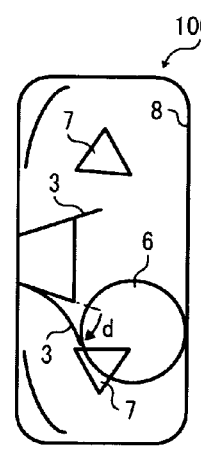 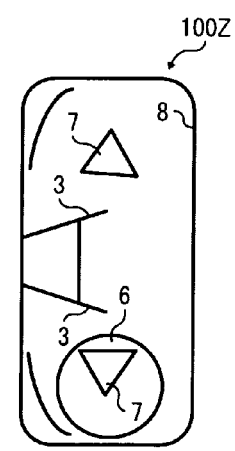

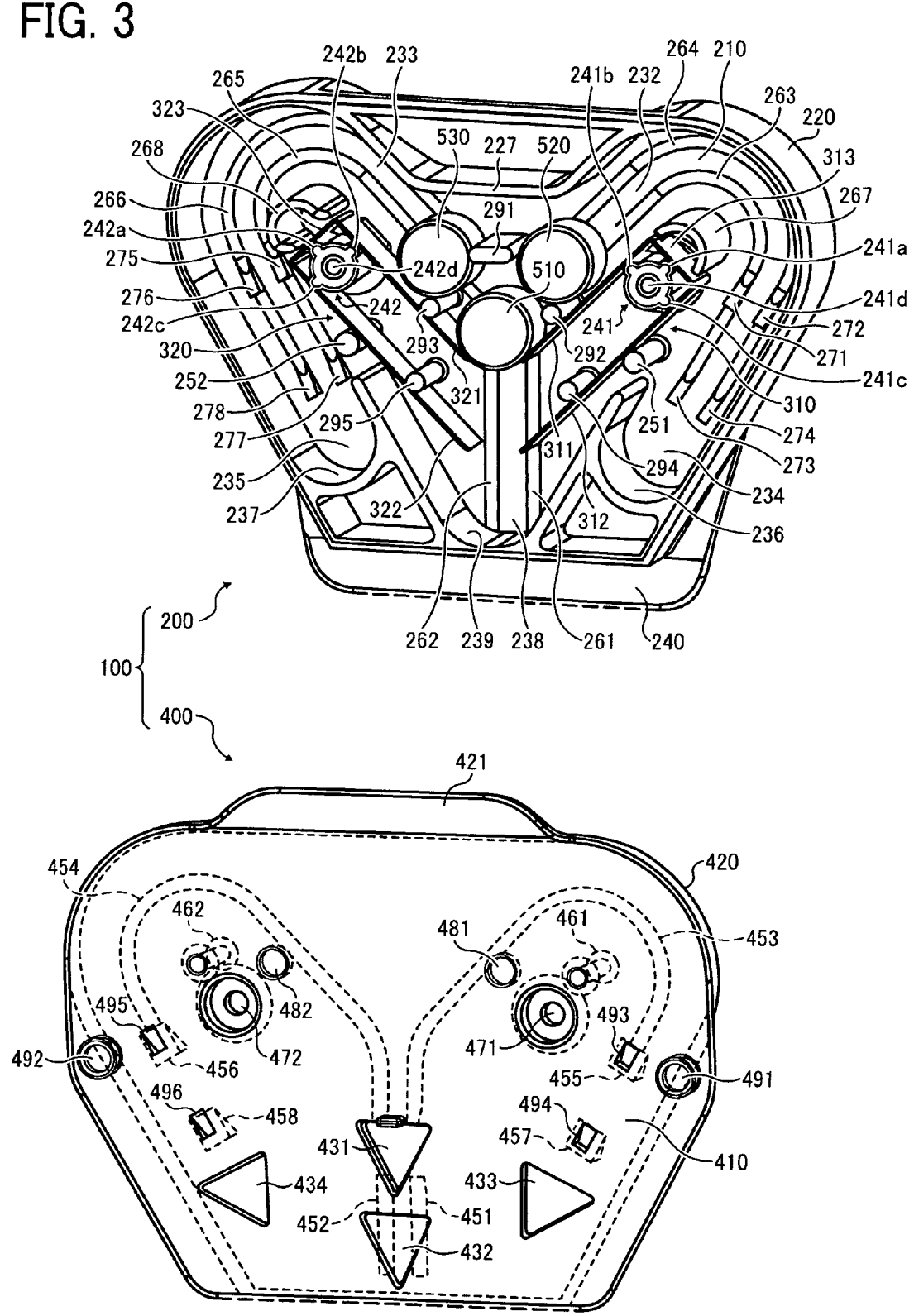

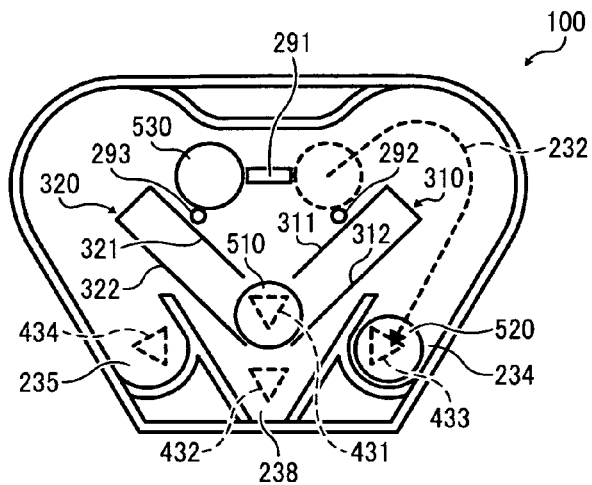
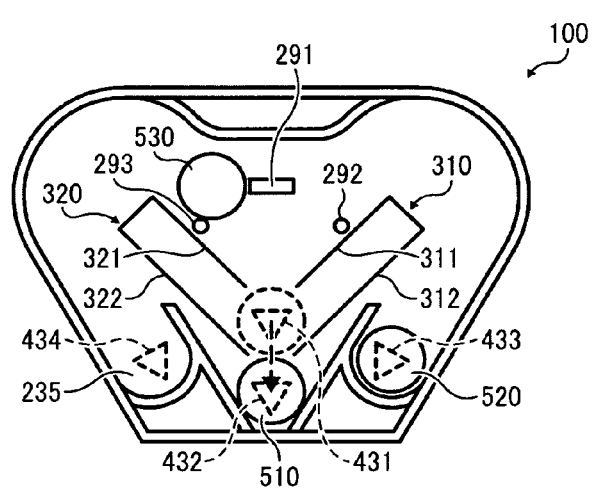
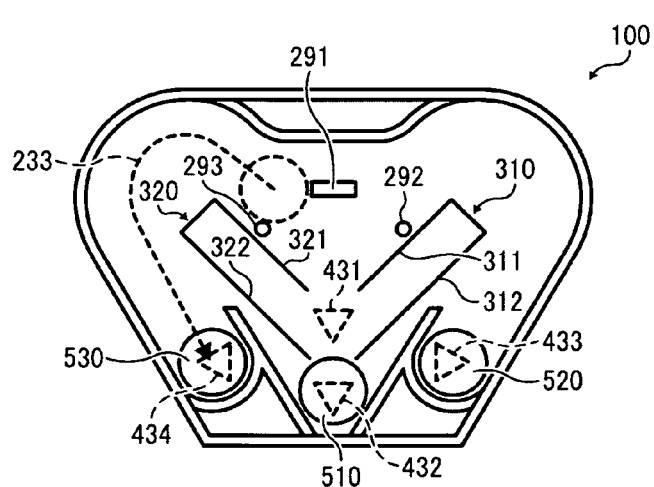

IMPACT DETECTOR AND PACKAGING CONTAINER

CROSS REFERENCE TO RELATED APPLICATIONS

The present specification is based on and claims priority pursuant to 35 U.S.C. §119 from Japanese Patent Application Nos. 2009-113387, filed on May 8, 2009, 2009-205545, filed on Sep. 7, 2009, and 2009-240254, filed on Oct. 19, 2009 in the Japan Patent Office, the contents of which are hereby incorporated by reference herein in their entirety.

BACKGROUND OF THE INVENTION

1. Field of the Invention

The present invention relates to an impact detector to detect impact to an article and a packaging container including the impact detector.

2. Discussion of the Background Arts

In the course of transport, it sometimes happens that fragile packaged articles such as precision equipment fall or are dropped due to inappropriate handling, accidents, or the like. The impact of the fall or drop can damage the articles. Articles can be prevented from being damaged by impact of a predetermined magnitude or smaller by taking damage prevention measures on the basis of pre-assessment of packaged articles.

For example, impact detectors may be used that include a weight having a smooth surface reflecting incident light and a beam supporting the weight. When impact of the fall or drop is detected, the weight tilts, enabling users to recognize that the impact detector has detected an impact.

FIGS. 1A through 1E illustrate another configuration of impact detectors. FIG. 1A is an exploded perspective view illustrating an impact detector 100Z, FIG. 1B illustrates an appearance of the impact detector 100Z, FIG. 1C illustrates an initial state of the impact detector 100Z, FIG. 1D illustrates a weight 6 moving in the impact detector 100Z due to impact thereto, and FIG. 1E illustrates an impact detections state of the impact detector 100Z.

As illustrated in FIG. 1A, the impact detector 100Z includes a front case 1, a rear case 2, a leaf spring 3, a leaf spring fixing portion 4, guide plates 5, the weight 6, and window holes 7. The impact detector 100Z can detect impact from below to a target article to which the impact detector 100Z at the position shown in FIG. 1B is attached, that is, the impact detector 100Z can detect that the article has been dropped. More specifically, as shown in FIG. 1C, at the initial state when the target article is not subjected to impact, the weight 6 is at an initial position, sandwiched by the leaf spring 3 and a wall 8 of the front case 1 and thus held in a center area of the impact detector 100Z. When the impact detector 100Z receives an impact from below, the weight 6 moves downward, overstrides a lower portion of the leaf spring 3, and then reaches an impact detection position at a bottom of the impact detector 100Z as shown in FIGS. 1D and 1E. The weight 6 may be colored to facilitate visual recognition of the weight 6 through the lower window hole 7.

However, the impact detector 100Z illustrated in FIGS. 1A through 1E has several drawbacks. For example, the impact detection accuracy of the impact detector 100Z tends to vary. That is, although the detection level is selectable among multiple different levels by changing the mass of the weight while an identical leaf spring is used for the respective detection levels in this type of impact detectors, actual detection performance can differ from the set detection level significantly, and thus the impact detector has relatively low detection accuracy.

One cause of the difference between the actual detection performance and the set detection level is the bending of an attachment base of the leaf springs 3, which is described in further detail below with reference to FIGS. 2A and 2B.

Referring to FIG. 2A, a gap greater than the thickness of the leaf springs 3 is formed between the front case 1 and the rear case 2 to insert therein the leaf springs 3, and a member for fixing the leaf springs 3 to the front case 1 is absent in a region indicated by reference numeral 9 shown in FIG. 2B. The bending of the base of the leaf springs 3 is caused by the impact received by the entire lower leaf spring 3. As a result, the resilient force of the leaf spring 3 is reduced, degrading the impact detection accuracy.

SUMMARY OF THE INVENTION

In view of the foregoing, one illustrative embodiment of the present invention provides an impact detector. The impact detector includes a weight having circular periphery, a case in which the weight is contained, a planar elastic member disposed on a first side of the case, and a fixing portion to fix the planar elastic member to the case. An interior of the case defines a transition path through which the weight moves when the case receives an impact of a predetermined magnitude in a first direction. The planar elastic member extends in the case with a first portion thereof oriented in a direction in which the weight moves upon the impact in the first direction and includes a folded portion, a first arm bent and extends from a first end portion of the folded portion, and a second arm extending from a second end portion of the folded portion opposite the first end portion from which the first arm extends. The folded portion is disposed on a second end portion of the planar elastic member opposite the first portion thereof. An end portion of the first arm holds the weight at an initial position in the transition path, and the first arm deforms to release the weight upon the impact in the first direction. The fixing portion includes a sandwiching portion to sandwich the folded portion and a contact portion to prevent the planar elastic member from moving in the direction in which the weight moves by contacting the first arm and the second arm of the planar elastic member.

In another illustrative embodiment, a packaging container includes a packaging container in which an article is contained and the above-described impact detector.

BRIEF DESCRIPTION OF THE DRAWINGS

A more complete appreciation of the invention and many of the advantages thereof are obtained as the same becomes better understood by reference to the following detailed description when considered in connection with the accompanying drawings, wherein:

FIG. 1A is an exploded perspective view illustrating a configuration of a related art impact detector;

FIG. 1B illustrates an appearance of the related art impact detector shown in FIG. 1A;

FIGS. 1C through 1E illustrate movement of a weight in the related art impact detector shown in FIG. 1A;

FIG. 3 is an exploded perspective view of an impact detector according to a first embodiment of the present invention;

FIGS. 11A to 11E are schematic diagrams illustrating operations of the impact detector;

DETAILED DESCRIPTION OF PREFERRED EMBODIMENTS

Figure 2A:
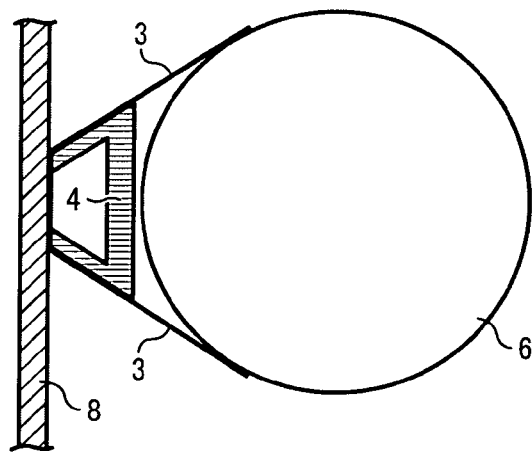
FIG. 2A is an enlarged plan view of a leaf spring attachment portion in the related art impact detector shown in FIG. 1A.
Figure 2B:
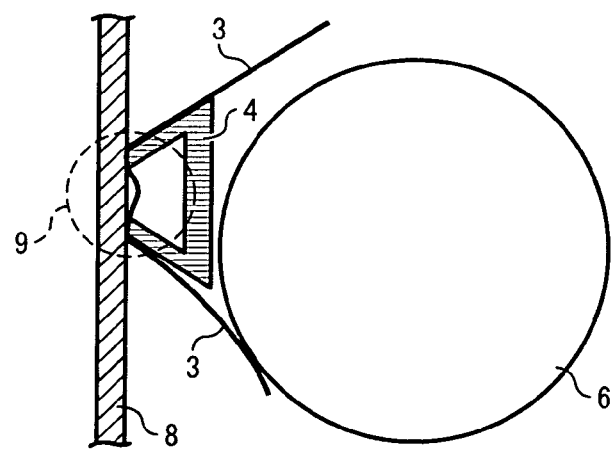
FIG. 2B is an enlarged plan view illustrating bending of the leaf spring attachment portion shown in FIG. 2A.

In describing the embodiments illustrated in the drawings, specific terminology is employed for the purpose of clarity. However, the disclosure of this patent specification is not intended to be limited to the specific terminology so used, and it is to be understood that substitutions for each specific element can include any technical equivalents that operate in a similar manner.

Referring now to the drawings, wherein like reference numerals designate identical or corresponding parts throughout the several views, particularly to FIGS. 3 to 10, a first embodiment of the present invention will be described below.

Figure 4:
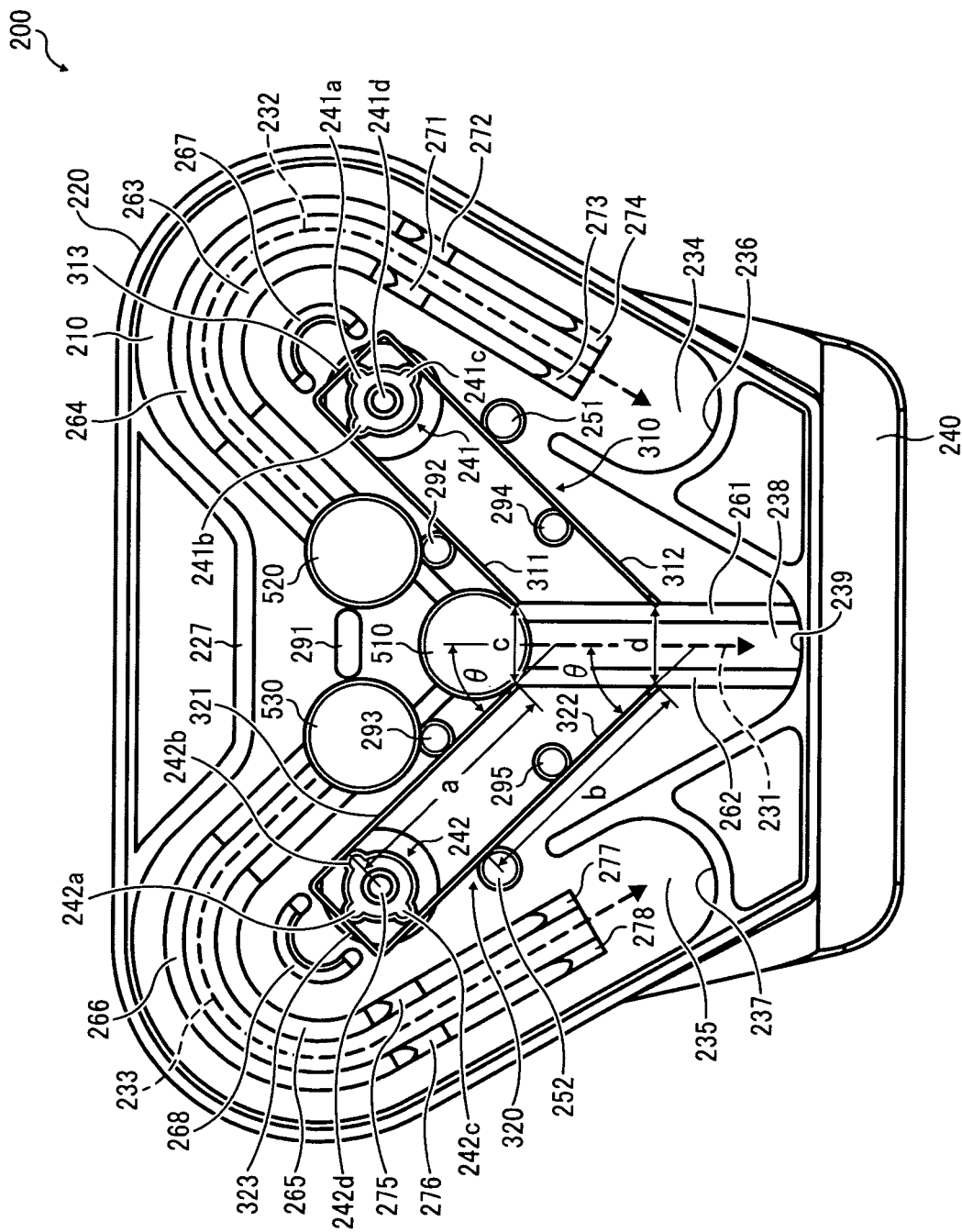
FIG. 4 is a plan view illustrating a rear case.
Figure 5:
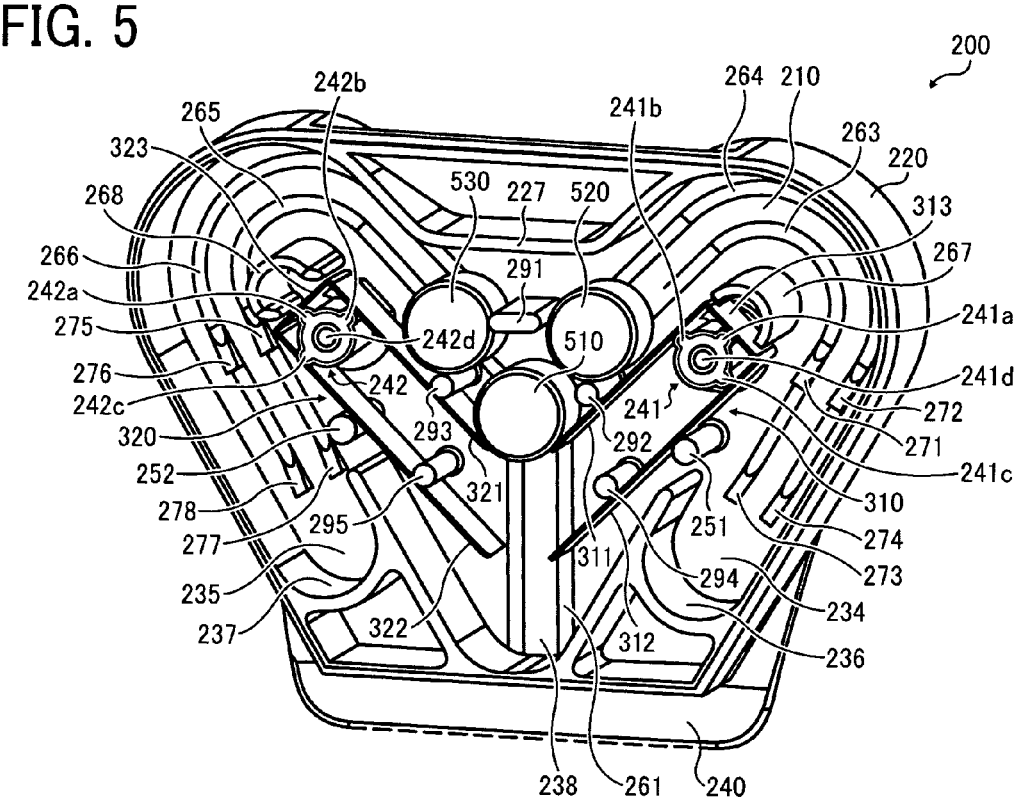
FIG. 5 is a perspective view illustrating the rear case.
Figure 6:
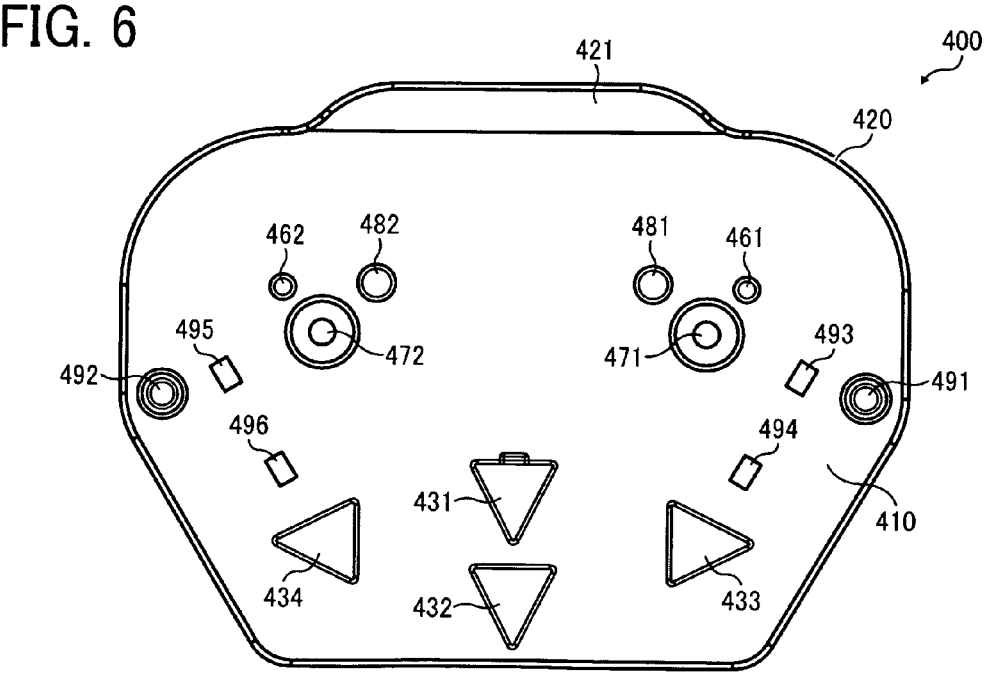
FIG. 6 is a plan view illustrating a front case.
Figure 7:
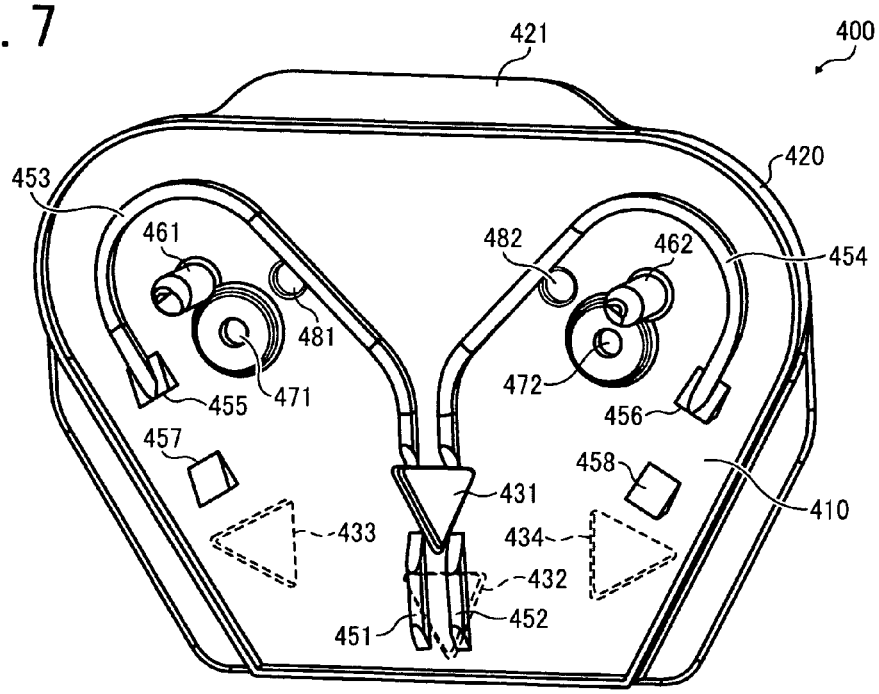
FIG. 7 is a perspective view illustrating the front case.
Figure 8:
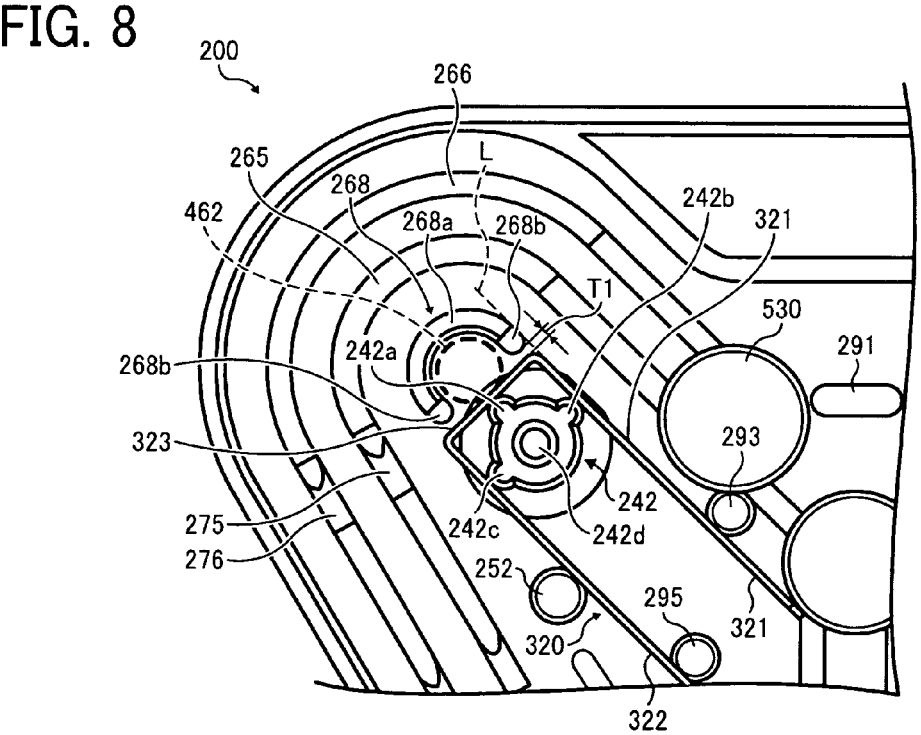
FIG. 8 is an enlarged plan view of a portion of the rear case.
Figure 9:
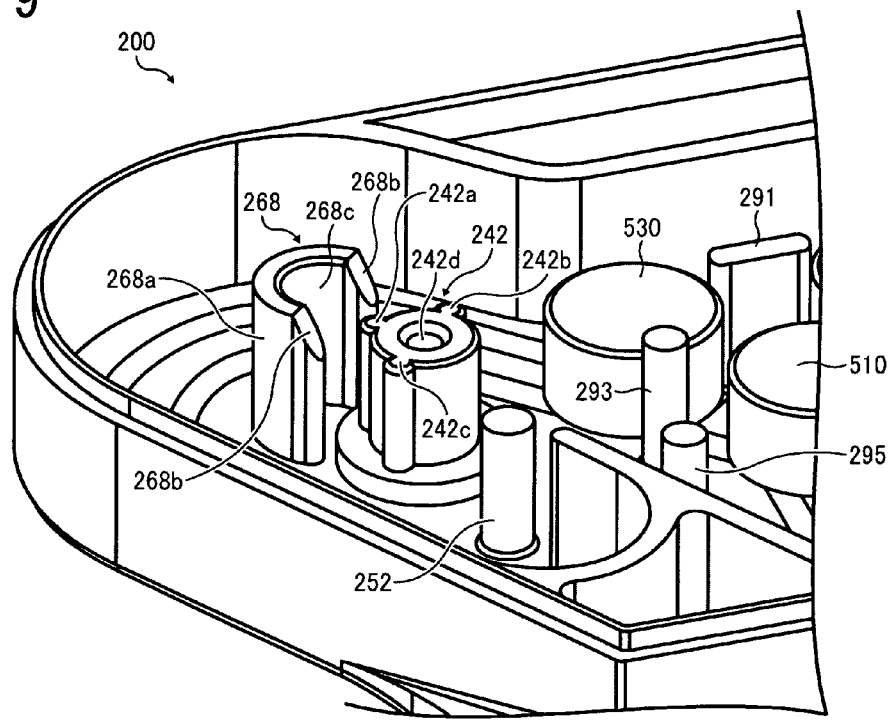
FIG. 9 is an enlarged perspective view of a portion of the rear case.
Figure 10:
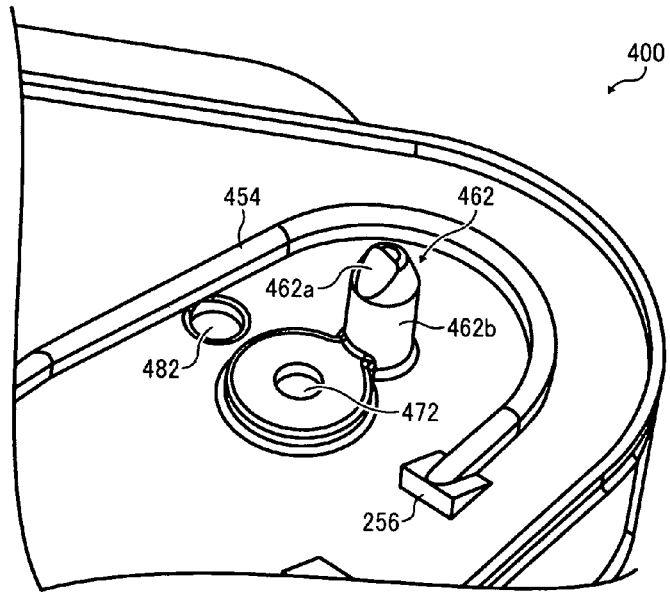
FIG. 10 is an enlarged perspective view of a portion of the front case.

FIG. 3 is an exploded perspective view of an impact detector according to the first embodiment of the present invention. FIGS. 4 and 5 are respectively plan view and a perspective view illustrating a rear case of the impact detector shown in FIG. 3. FIGS. 6 and 7 are respectively a plan view and a perspective view illustrating a front case of the impact detector shown in FIG. 3. FIGS. 8 and 9 are respectively an enlarged plan view and an enlarged perspective view of a main portion of the rear case. FIG. 10 is an enlarged perspective view of a main portion of the front case.

As shown in FIG. 3, an impact detector 100 according to the present embodiment includes a case formed by a rear case 200 and a front case 400 for covering the front side of the rear case 200. The case contains three weights, i.e., a first weight 510, a second weight 520, and a third weight 530. The impact detector 100 detects vertical impact and displays history of the vertical impact with the movement of the first weight 510. Further, the impact detector 100 detects a rightward tilt and a leftward tilt from an initial state (standing state) shown in FIG. 3 and displays history of the rightward tilt and the leftward tilt with the movement of the second weight 520 and the third weight 530, respectively. Thereby, the impact detector 100 displays the history of drops, tilts, and falls of a packaging container, e.g., an image forming apparatus in a cardboard box, to which the impact detector 100 is attached.

In the present embodiment, the first weight 510 is held by a right planar member 310 and a left planar member 320 (i.e., elastic planar members) and can detect impact from below, (drop impact) twice. The right planar member 310 is formed as a single member with a first holding member 311 (first arm) positioned on an upper side and a second holding member 312 (second arm) positioned on a lower side, which are connected together by a folded portion 313. The left planar member 320 is formed as a single member by a first holding member 321 (first arm) positioned on an upper side and a second holding member 322 (second arm) positioned on a lower side, which are connected together by a folded portion 323. For example, each of the right planar member 310 and the left planar member 320 can be formed by a thin elastic stainless steel plate folded into a substantially angled U-shape, that is, the folded portions 313 and 323 are substantially linear.

At an initial position in a vertical transition path 231 (represented by broken arrow shown in a center lower portion in FIG. 4), the first weight 510 is supported on both sides by the first holding member 311 of the right planar member 310 and the first holding member 321 of the left planar member 320. With the first drop impact, the first weight 510 pushes the first holding members 311 and 321 away from each other, drops, and then is held by the second holding members 312 and 322. With the second drop impact, the first weight 510 pushes the second holding members 312 and 322 away from each other and then drops.

Further, with a tilt of the impact detector 100 to the right (rightward tile), the second weight 520 rotates to the right on the upper side of the first holding member 311. With a tilt of the impact detector 100 to the left (leftward tile), the third weight 530 rotates to the left on the upper side of the first holding member 321. With the above-described configuration, the impact detector 100 detects a drop with the movement of the first weight 510, detects a rightward tilt with the movement of the second weight 520, and detects a leftward tilt with the movement of the third weight 530.

The other components of the impact detector 100 will now be described below.

The rear case 200 can be made of a synthetic resin and includes a bottom plate 210 and a wall portion 220 standing upright along the circumference of the bottom plate 210. The rear case 200 further includes the vertically extending vertical transition path 231 through which the first weight 510 moves upon a drop impact. The rear case 200 further includes, on both sides of the vertical transition path 231, a curved right transition path 232 (represented by broken arrow shown on the right in FIG. 4) through which the second weight 520 moves and a curved left transition path 233 through which the third weight 530 moves (represented by broken arrow shown on the left in FIG. 4).

A right weight holding portion 234, a left weight holding portion 235, and a lower weight holding portion 238 are formed below the right transition path 232, the left transition path 233, and the vertical transition path 231, respectively. The right weight holding portion 234, the left weight holding portion 235, and the lower weight holding portion 238 are formed by rib members 236, 237, and 239, respectively, which stand upright on the bottom plate 210.

The impact detector 100 includes a first right supporting member 241, an arc-shaped member 267, and a pressing member 461, together forming a fixing member to fix the right planar member 310 to the case, and a first left supporting member 242, an arc-shaped member 268, and a pressing member 461, together forming a fixing member to fix the left planar member 320 to the case.

On the right and left sides of the vertical transition path 231, the first right supporting member 241 and the first left supporting member 242 having a predetermined shape and size stand upright on the bottom plate 210. The first right and left supporting members 241 and 242 serve as columnar members each having an irregular circumference. The first right supporting member 241 holds the folded portion 313 of the right planar member 310 fitted therein. The first left supporting member 242 holds the folded portion 323 of the left planar member 320 fitted therein. Further, on the bottom plate 210, the arc-shaped member 267 stands upright above the outer side of the first right supporting member 241 to fix the right planar member 310, and the arc-shaped member 268 stands upright above the outer side of the first left supporting member 242 to fix the left planar member 320. The arc-shaped members 267 and 268 also serve as respective inner guide portions of the right transition path 232 and the left transition path 233.

Further, a second right supporting member 251 and a second left supporting member 252 stand upright below the first right supporting member 241 and the first left supporting member 242, respectively. The second right supporting member 251 and the second left supporting member 252 are smaller in diameter than the first right supporting member 241 and the first left supporting member 242, respectively. The second right supporting member 251 and the second left supporting member 252 prevent rotation of the right planar member 310 and the left planar member 320, respectively.

The second right supporting member 251 and the second left supporting member 252 also serve as respective fulcrums on which the second holding member 312 forming the lower portion of the right planar member 310 and the second holding member 322 forming the lower portion of the left planar member 320 deform elastically.

Further, the bottom plate 210 is provided with two vertical weight guide rails 261 and 262 that are in contact with the first weight 510, and the vertical weight guide rails 261 and 262 guide the first weight 510 to move smoothly along the vertical transition path 231. Further, the bottom plate 210 is provided with right weight guide rails 263 and 264 formed along the right transition path 232 and left weight guide rails 265 and 266 formed along the left transition path 233. Each of the weight guide rails 263, 264, 265, and 266 and the bottom plate 210 are formed as a united single member. Further, to reduce the contact resistance between the weight guide rail and the corresponding weight, the weight guide rail is arc-shaped in a cross section on the side in contact with the weight.

Further, to prevent the reverse movement of the second and third weights 520 and 530, the bottom plate 210 is provided with non-return projections 271 and 273, 272 and 274, 275 and 277, and 276 and 278 formed at respective two locations of the right weight guide rails 263 and 264 and the left weight guide rails 265 and 266. Further, the bottom plate 210 is provided with a stop plate 291 disposed in an upper portion of the rear case 200 shown in FIGS. 3 through 5, weight supporters 292 and 293, and positioning members 294 and 295, which stand upright on the bottom plate 210. The stop plate 291 prevents the first weight 510 from jumping. The weight supporters 292 and 293 support respective lower portions of the second weight 520 and the third weight 530. The positioning members 294 and 295 regulate respective upper positions of the second holding members 312 and 322. Further, the wall portion 220 includes a horizontal portion 227 located above the stop plate 291 and in the proximity of the stop plate 291.

The rear case 200 further includes a flange portion 240 extending downward, to be attached to a packaging container. The flange portion 240 is formed as an extension of the bottom plate 210.

Thus, the rear case 200 has a line-symmetric structure with respect to the vertical transition path 231.

Next, the front case 400 will be described below.

The front case 400 can be made of a transparent or semi-transparent synthetic resin. As illustrated in FIGS. 6 and 7, the front case 400 includes a planar body 410 for covering the front side of the rear case 200 entirely and a wall portion 420 formed around a circumference of for alignment. Further, display windows for checking the position of the first to third weights 510 to 530 are formed in the planar body 410. That is, the front case 400 includes a first display window 431 for displaying the detection of the first drop, a second display window 432 for displaying the detection of the second drop, a third display window 433 for displaying the detection of the rightward tilt, and a fourth display window 434 for displaying the detection of the leftward tilt. Herein, the first display window 431 is formed at a position corresponding to the first weight 510 held by the second holding members 312 and 322. The second display window 432 is formed at a position corresponding to the lower weight holding portion 238. The third display window 433 is formed at a position corresponding to the right weight holding portion 234. The fourth display window 434 is formed at a position corresponding to the left weight holding portion 235. In the present embodiment, the first display window 431 is a triangular hole. Each of the second, third, and fourth display windows 432, 433, and 434 is triangular similarly. Each of the second, third, and fourth display windows 432, 433, and 434 is not a hole but is a thinner portion, thinner than the other area of the planar body 410, with a polished surface to allow users to observe inside the case visually.

Further, on a surface of the planar body 410 on the side facing the rear case 200, two vertical weight guide rails 451 and 452 corresponding to the vertical transition path 231, a right weight guide rail 453 corresponding to the right transition path 232, and a left weight guide rail 454 corresponding to the left transition path 233 are formed. Each of the weight guide rails 451 to 454 and the planar body 410 are formed as a single unit. To reduce the contact resistance between the weight guide rail and the corresponding weight, the weight guide rail is arc-shaped in a cross section on the side in contact with the weight. Further, to prevent the reverse movement of the second and third weights 520 and 530, the right and left weight guide rails 453 and 454 include non-return projections 455 and 457 and 456 and 458, respectively. The non-return projections 455, 457, 456, and 458 are respectively disposed corresponding to the non-return projections 271, 272, 273, 274, 275, 276, 277, and 278 formed on the rear case 200.

Further, the planar body 410 is provided with cylindrical pressing members 461 and 462 to be fit in the arc-shaped members 267 and 268 formed on the bottom plate 210, respectively. When the front case 400 is attached to the rear case 200, the pressing members 461 and 462 are inserted in the arc-shaped members 267 and 268, respectively. Thereby, the right planar member 310 supported by the first right supporting member 241 and the left planar member 320 supported by the first left supporting member 242 are fixed with their end portions to hold the weight 510 positioned lower than a center portion of the rear case 200. Herein, referring to FIG. 10, the pressing members 461 and 462 respectively include tilted portions 461a and 462a although FIG. 10 illustrates only a right portion of the front case 400 shown in FIG. 7 and the pressing members 461 is not illustrated in FIG. 10. Thereby, the assembling quality of the front case 400 and the rear case 200 with the right and left planar members 310 and 320 attached thereto can be improved.

Thus, a second end portion (upper right side in FIGS. 3 through 5) of the right planar member 310 is fixed in the rear case 200, and a second end portion (upper left side in FIGS. 3 through 5) of the planar member 320 is fixed in the rear case 200. It is to be noted that, with this state, first end portions of the planar members 310 and 320 (end portions of the first and second holding members 311, 321, 312, and 322) that hold the weight 510 is movable, deformed by the weight 510.

Further, as illustrated in FIG. 6, screw holes 471 and 472 are formed in the planar body 410 of the front case 400 for screws for fixing the front case 400 to the rear case 200. Further, insertion holes 481 and 482 are formed in the planar body 410 of the front case 400 for a fixing member for fixing the first to third weights 510 to 530. For example, the weight fixing member is a meal wire bent to have three leg portions. When the impact detector 100 is not used, the leg portions are inserted in the first display window 431 and the insertion holes 481 and 482 and placed in contact with a lower portion of the first weight 510 and respective upper portions of the second and third weights 520 and 530. Thereby, the first to third weights 510 to 530 are fixed, and thus the impact detector 100 inactivated (a non-detection state). Further, holes 491 and 492 are formed in the planar body 410 for aligning a sealing member 740 described later (see FIG. 12A), and recessed portions 493, 494, 495, and 496 for preventing sink marks caused by the non-return projections 455, 457, 456, and 458 in the production of the front case 400.

Next, a detailed structure of the rear case 200 will be described on the basis of FIGS. 8 and 9.

The rear case 200 of the impact detector 100 according to the present embodiment has a bilaterally symmetric shape. Therefore, FIGS. 8 and 9 illustrate only a left part of the rear case 200 for simplicity. Screw holes 241d and 242d are respectively formed in center portions of the first right supporting member 241 and the first left supporting member 242 to screw the front case 400 to the rear case 200. The screw hole 241 is surrounded by a small cylindrical screw fixing boss.

Further, the first right supporting member 241 includes a sandwiching projection 241a and contact projections 241b and 241c, each of which has a semicircular cross section and projects from the circumference of the screw fixing boss. The sandwiching projection 241a of the first right supporting member 241 and the pressing member 461 formed in the front case 400 together form a sandwiching portion of the fixing member to fix the second end portion of the planar elastic member (310). Similarly, the first left supporting member 242 includes a sandwiching projection 242a and contact projections 242b and 242c, each of which has a semicircular cross section and projects from the circumference of a small cylindrical screw fixing boss surrounding the screw hole 242d. The sandwiching projection 242a of the first right supporting member 242 and the pressing member 462 formed in the front case 400 together form a sandwiching portion of the fixing member to fix the second end portion of the planar elastic member (320).

With this reduction in diameter of the right and first left supporting members 241 and 242 serving as the screw fixing bosses, the torque required to tighten the screws can be reduced. Accordingly, poor screw tightening can be prevented or reduced, and the assembling work efficiency can be improved.

Further, the arc-shaped members 268 and 267 include guide surfaces 268a and 267a, respectively, formed on outer circumferences thereof to guide the third weight 530 and the second weight 520, respectively, and include guide surfaces 268c (shown in FIG. 9) and 267c, respectively, formed on respective inner circumferences thereof to guide the pressing members 462 and 461, respectively. Further, the arc-shaped members 268 and 267 include tilted surfaces 268b and 267b, respectively, to facilitate insertion of the left planar member 320 between the first left supporting member 242 and the arc-shaped member 268 and insertion of the right planar member 310 between the first right supporting member 241 and the arc-shaped member 267 when the left and right planar members 320 and 310 are attached to the rear case 200.

Thus, the respective sandwiching portions of the fixing members to fix the planer member 310 and 320 includes the first projections (241a and 242a) provided on the rear case 200 and the second projections (461 and 462) provided in the front case 400. The fixing members to fix the planer member 310 and 320 further include the guide portions (267 and 268) provided in the rear case 200 to guide the second projections (461 and 462). This configuration can facilitate assembling the impact detector 100. Because the end portion of the guide portions (267 and 268) facing the first projection (241a and 242a) is tilted (tilted surfaces 268b and 267b), inserting the planar members 310 and 320 to the case can be facilitated.

Herein, both end portions of the arc-shaped member 268 do not project from an extension line of the first holding member 321 (i.e., the broken line L in FIG. 8) and an extension line (not shown) of the second holding member 322. Similarly, both end portions of the arc-shaped member 267 do not project from extension lines of the first holding member 311 and the second holding member 312, respectively. With this configuration, a gap T1 between the arc-shaped member 268 and the first holding member 321 of the left planar member 320 is smaller than the diameter of the third weight 530. Thereby, the third weight 530 is prevented from being caught by the gap T1 when moving to the upper-left in FIG. 8 from the first holding member 321 to the end portion of the arc-shaped member 268.

Next, the right and left planar members 310 and 320 will be described below.

In the present embodiment, the right planar member 310 is formed by a thin stainless steel plate having a width of, for example, approximately 6 millimeters and a thickness of, for example, approximately 0.3 millimeters, and bent at both ends of the folded portion 313 to form the first holding member 311 and the second holding member 312 serving as arm portions with an upper portion and a lower portion of the plate, respectively. Further, the left planar member 320 is formed by a thin stainless steel plate having the same width of, for example, approximately 6 millimeters and the same thickness of, for example, approximately 0.3 millimeters, and bent at both ends of the folded portion 323 to form the first holding member 321 and the second holding member 322 serving as an arm portions with an upper portion and a lower portion of the plate, respectively.

In the configuration shown in FIGS. 8 and 9, the second end portions of the right planar member 310 and the left planar member 320 are clamped with the folded portions 313 and 323 in contact with the sandwiching projection 241a of the first supporting member 241 and a sandwiching projection 242a of the first supporting member 242, respectively, and then the pressing members 461 and 462 of the front case 400 are inserted in and pressed by the arc-shaped members 267 and 268, respectively. Further, the first holding members 311 and 321 are in contact with and fixed by the contact projections 241b and 242b, respectively, and the second holding members 312 and 322 are in contact with and fixed by the contact projections 241c and 242c, respectively.

It is to be noted that, when minor adjustment of the resilience force of the right and left planar members 310 and 320 is required, the right and left planar members 310 and 320 may be formed of phosphor bronze. Further, if it is necessary to prevent the formation of rust for long-term storage reliably, the right and left planar members 310 and 320 may be made of a resin such as nylon.

As illustrated in FIGS. 8 and 9, when the left planar member 320 is attached to the rear case 200, the folded portion 323 is in contact with and held by the sandwiching projection 242a, and the first holding member 321 and the second holding member 322 are in contact with and held by the contact projections 242b and 242c, respectively. When the front case 400 is attached to the rear case 200 in this state, the pressing member 462 of the front case 400 is inserted in the arc-shaped member 268 and in contact with the folded portion 323. Thereby, the folded portion 323 is sandwiched and fixed by the pressing member 462 and the sandwiching projection 242a. In consideration of the tolerances of the components and the structure in which the sandwiching projection 242a and the pressing member 462 are provided to different members, the sandwiching projection 242a and the pressing member 462 have dimensional errors. Therefore, it is possible that the pressing member 462, the sandwiching projection 242a, and the folded portion 323 are not in close contact with one another practically in some cases. However, because the first holding member 321 and the second holding member 322 of the left planar member 320 are in contact with the contact projections 242b and 242c, respectively, the left planar member 320 can be held reliably in the rear case 200. In this specification, the state in which "the right and left planar members 310 and 320 are clamped" includes a state in which the components are not fully in contact with one another due to slight gaps formed therebetween as in the description above.

Herein, when the front case 400 is attached to the rear case 200 by sliding the pressing member 462 along the guide surface 268c of the arc-shaped member 268, if the position of the folded portion 323 is shifted to the arc-shaped member 268, the folded portion 323 and the pressing member 462 interfere with each other, and thus the front case 400 cannot be attached to the rear case 200. Therefore, in the present embodiment, the tilted portion 462a is formed in the edge portion of the pressing member 462 on the side facing the folded portion 323. Even if the folded portion 323 is shifted to the arc-shaped member 268, the folded portion 323 can be guided along the tilted portion 462a, after which the position of the pressing member 462 on the side of the arc-shaped member 268 is regulated by the guide surface 268c. Then, the folded portion 323 is moved to the sandwiching projection 242a by a cylindrical portion 462b of the pressing member 462 disposed beneath the tilted portion 462a in FIG. 10. Therefore, the folded portion 323 can be sandwiched by the cylindrical portion 462b of the pressing member 462 and the sandwiching projection 242a.

Next, description will be made of the state of the left planar members 310 and 320 when the impact detector 100 receives a downward impact.

When the impact detector 100 receives the downward impact, the first weight 510 is disengaged from the first holding member 321 and moves downward. More specifically, the first weight 510 moves while pushing downward end portions (i.e., a points of action) of the first holding members 311 and 321 of the right and left planar members 310 and 320 in contact with the first weight 510. In this process, because each of the right and left planar members 310 and 320 is held at three points, a center portion of each of the folded portions 313 and 323 is not deformed, but the first holding members 311 and 321 deform at positions in contact with the contact projection 241b and 242b serving as fulcrums. Accordingly, the detection accuracy can be improved.

Additionally, in the present embodiment, the entirety of the left planar member 320 of the present embodiment is formed into a substantially angled U-shape, and the folded portion 323 is not curved but is linear. With the left planar member 320 that is substantially angled U-shaped, the distance of the gap T1 (shown in FIG. 8) between the end portion of the arc-shaped member 268 and the folded point between the first holding member 321 and the folded portion 323 can be reduced. The right planar member 310 is configured similarly. As a result, the third weight 530 can move smoothly without being caught in the gap between the first holding member 321 and the arc-shaped member 268.

As illustrated in FIG. 4, according to the present embodiment, in the state in which the right and left planar members 310 and 320 are attached to the rear case 200, an effective spring length (indicated by double-headed arrow a shown in FIG. 4, hereinafter "effective spring length a") of the first holding member 311 extends from a point of contact between the first holding member 311 and the first supporting member 241 to a lower end of the first holding member 311. Similarly, an effective spring length of the first holding member 321 extends from a point of contact between the first holding member 321 and the first supporting member 242 to a lower end of the first holding member 321. Further, an effective spring length (indicated by double-headed arrow b shown in FIG. 4, hereinafter "effective spring length b") of the second holding member 312 extends from a point of contact between the second holding member 312 and the second supporting member 251 to a lower end of the second holding member 312. Similarly, an effective spring length of the second holding member 322 extends from a point of contact between the second holding member 322 and the second supporting member 252 to a lower end of the second holding member 322. In the present embodiment, the effective spring lengths a and b are identical or similar and approximately 20 millimeters, for example. Further, in the present embodiment, a gap between the first holding members 311 and 321 (indicated by double-headed arrow c shown in FIG. 4, hereinafter "gap c") and a gap between the second holding members 312 and 322 (indicated by double-headed arrow d shown in FIG. 4, hereinafter "gap d") are identical or similar. Therefore, two impacts of the same magnitude can be detected with the use of the same first weight 510.

Further, in the present embodiment, each of the first holding members 311 and 321 and the second holding members 312 and 322 forms an angle θ (θ<90 degrees) with the vertical transition path 231. Hereinafter, the angle θ is assumed to be 45 degrees, for example.

As described above, the first holding members 312 and 322 on the upper side serve as the lower guide member for guiding the second weight 520 moving through the right transition path 232 and the lower guide member for guiding the third weight 530 moving through the left transition path 233, respectively. Therefore, a threshold of angle of tilt is set with the above-described angle θ. Herein, the angle θ determines the threshold angle of tilt to be detected and affects the sensitivity level of the impact detection using the first weight 510. In the present embodiment, the angle θ is set to 45 degrees in consideration that the packaging container, to which the impact detector 100 is attached, is rectangular parallelepiped generally.

The magnitude of drop impact to be detected and the accuracy thereof are determined by factors including the above-described angle θ and a variety of characteristics of the planar members 310 and 320, such as the material, the cross-sectional shape, the effective spring lengths a and b, the distance of the gap c between the end portions of the first holding members 311 and 321, the distance of the gap d between the end portions of the second holding members 312 and 322, and the mass and the diameter of the first weight 510. In the present embodiment, the values of these factors are set on the assumption that the impact detector 100 is applied to a relatively large packaging container. In general, a relatively large packaging container is mainly intended to detect a drop from a relatively low position rather than a drop from a relatively high position. If the mass of the weight 510 is relatively small, it is difficult to detect a drop impact from a relatively low position, unless the spring force of the first and second holding members 311, 321, 312, and 322 is substantially reduced. To detect the drop impact from a relatively low position by using relatively light weights, holding members having relatively small spring force are required. In this case, the detection accuracy is deteriorated. The fluctuation in the detection accuracy can be caused by friction or engagement between the weight 510 and the first and second holding members 311, 321, 312, and 322, deformation of the folded portions 313 and 323, and the like.

In view of the above, the present embodiment uses a weight having a certain amount of mass as the weight 510. For example, in the present embodiment, the weight 510 is a tablet-like stainless steel weight having a circular periphery, a diameter of approximately 10 millimeters, a thickness of approximately 6 millimeters, and a mass of approximately 3.7 grams. Preferably, the weight 510 is chamfered to prevent the friction and engagement with the first and second holding members 311, 321, 312, and 322. The outer surface of the weight 510 may exhibit the color of the metal forming the weight. Alternatively, the weight may be colored at least partly differently from other components or marked with a sticker to improve the visibility. The material of the weight 510 preferably has a relatively high specific gravity such as stainless steel because, in that case, the thickness and size of the weight can be reduced, resulting in the reduction in the size of the impact detector 100. As the material forming the weight, other metals such as aluminum, for example, may also be used.

Herein, the specifications of the right and left planar member 310 and 320 required to detect a drop impact from a predetermined height with a predetermined weight can be obtained by calculation. More specifically, the amount of deformation of a leaf spring (first and second holding members 311, 321, 312, and 322) formed of a predetermined material, having a predetermined cross-sectional shape, caused by impact energy from a predetermined height is calculated, and a necessary effective spring length is derived based on the calculated amount of deformation. Based on the calculation above, the respective dimensions of the first holding members 311 and 321 and the second holding members 312 and 322 are determined. It is to be noted that, if the effective length of the leaf spring is short compared with the diameter of the weight 510, the weight 510 cannot be separated from the leaf spring unless the amount of displacement (deformation) of the leaf spring is increased. However, increasing the amount of deformation of the leaf spring can increase the length of the end portion of the leaf spring in contact with the weight 510 and the time of contact therebetween. As a result, the leaf spring and the weight 510 engage with each other, and the weight 510 supported by the leaf spring fails to drop in some cases. Therefore, the effective length of the leaf spring needs to be relatively long compared with the diameter of the weight 510.

Next, operation of the impact detector 100 will be described below.

FIGS. 11A to 11E are schematic diagrams illustrating operations of the impact detector 100.

Figure 11A:
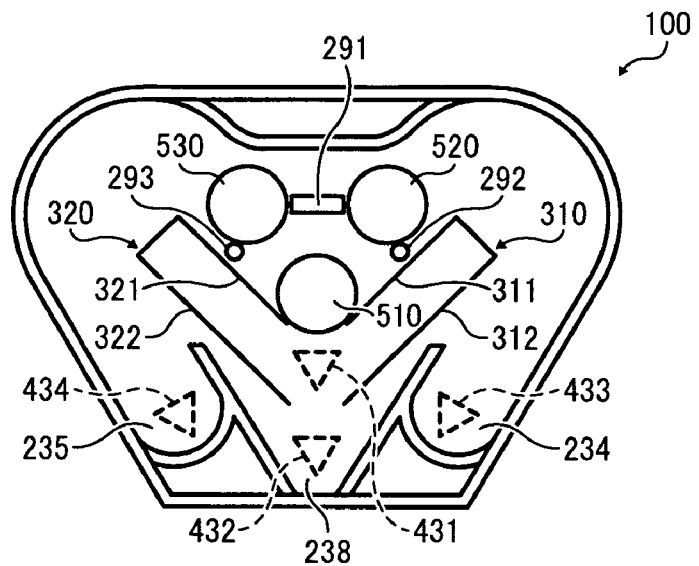

In the initial state shown in FIG. 11A, the first weight 510 is held by the first holding members 311 and 321, the second weight 520 is held by the stop plate 291 and the weight supporter 292, and the third weight 530 is held by the stop plate 291 and the weight supporter 293. The first to third weights 510 to 530 are not visually observed through any of the display windows 431 to 434 in the initial state.

With an initial drop (first drop) from the initial state, the first weight 510 pushes away the first holding members 311 and 321 from each other, drops, and then is held by the second holding members 312 and 322. Thereby, the first weight 510 is visually observable through the first display window 431 (FIG. 11B).

Figure 11B:
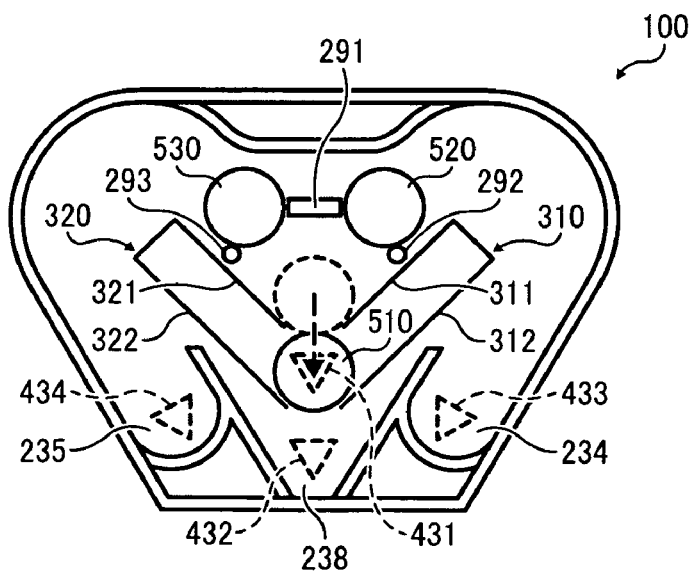

With a rightward tilt from the state shown in FIG. 11B, the second weight 520 rotates rightward in FIG. 11C, guided by the upper surface of the first holding member 311 of the right planar member 310, drops along the right transition path 232, and then is held by the right weight holding portion 234. In this state, the second weight 520 is visually observable through the third display window 433 (FIG. 11C).

Further, with a subsequent drop (second drop) from the state shown in FIG. 11C, the first weight 510 pushes away the second holding members 312 and 322 from each other, drops, and then is held in the lower weight holding portion 238.

Thereby, the first weight 510 is visually observable through the second display window 432 (FIG. 11D). Thus, in the present embodiment, the impact caused by the drop can be detected twice with a single impact detector.

It is to be noted that, although the second holding members 312 and 322 (second arms) of the planar members 310 and 320 have length equal or similar to that of the first folding members 311 and 322 in the present embodiment to support the weight 510 released upon the initial drop impact, alternatively, the second holding members 312 and 322 may be shorter than the first folding members 311 and 322 as long as the second holding members 312 and 322 are supported by the contact projections 241c and 242c and the like, respectively, to prevent rotation of the planar members 310 and 320 when the weight 510 causes them to deform upon the drop impact. It this case, the drop impact is detected only once.

With a leftward tilt from the state shown in FIG. 11D, the third weight 530 rotates leftward in FIG. 11E, guided by the upper surface of the first holding member 321 of the left planar member 320, drops through the left transition path 233, and then is held in the left weight holding portion 235. In this state, the third weight 530 is visually observable through the fourth display window 434 (FIG. 11E).

As described above, according to the present embodiment, the first to third weights 510 to 530 are visually observable through the display windows 431 to 434 in accordance with the first and second drops and the rightward and leftward tilts. Accordingly, the history of drop impacts to and tilts of the impact detector 100 can be displayed with the first to third weights 510 to 530 visible through the display windows 431 to 434 of the impact detector 100.

Further, in the present embodiment, because the folded portions 313 and 323 of the planar members 310 and 320 are sandwiched and fixed by the sandwiching projection 241a and 242a and the pressing members 461 and 462, forming the fixing members, deformation of the center portion of the folded portions 313 and 323 can be reduced. Further, because the contact projections 241b, 241c, 242b, and 242c are in contact with the planar members 310 and 320, deformation of portions of the folded portions 313 and 323 between the sandwiched portion and the contact projections 241b, 241c, 242b, and 242c can be reduced. Thus, accuracy of detecting impact using the bias force of springs, that is, the right and left planar members 310 and 320, can be enhanced.

Additionally, because the planer members 310 and 320 are U-shaped, unnecessary deformation thereof can be reduced.

Additionally, because the arms (311, 312, 321, and 322) of the planar members 310 and 320 function both the holding members to hold the weight at the initial position and guide members to guide the weight moving to the side to which the case is tilted when the case is tilted, the impact detector can be relatively compact.

A packaging container according to an embodiment of the present invention will now be described below with reference to FIGS. 12A to 12C.

Figure 12A:
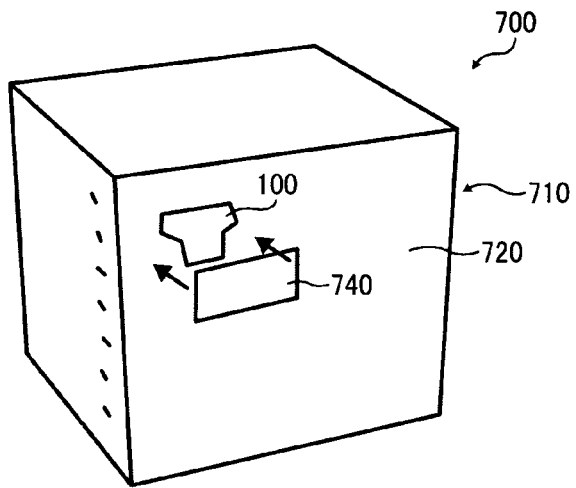
FIG. 12A is a perspective view illustrating a packaging container.
Figure 12B:
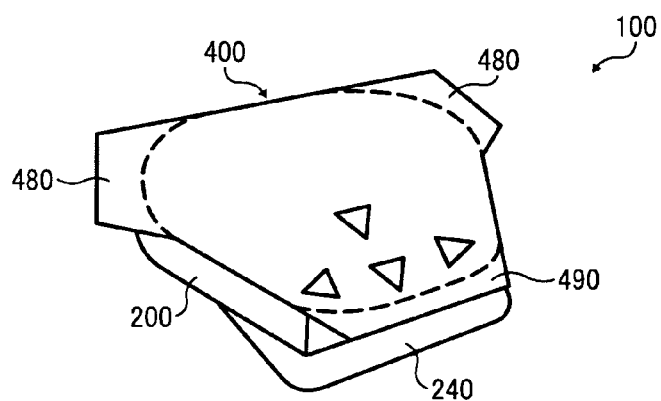
FIG. 12B is a perspective view illustrating the impact detector to be attached to the packaging container shown in FIG. 12A.
Figure 12C:
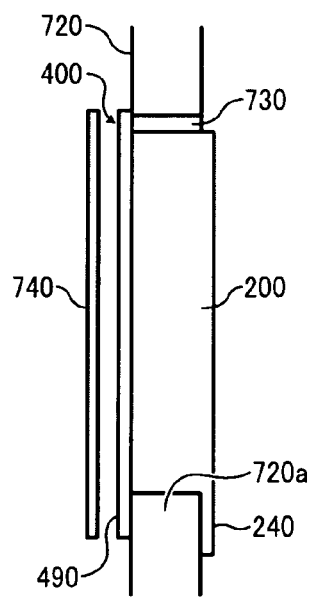
FIG. 12C is a cross-sectional view illustrating a state of the impact detector attached to the packaging container shown in FIG. 12A.

FIGS. 12A to 12C are schematic diagrams illustrating a packaging container including the impact detector 100. FIG. 12A is a perspective view illustrating the packaging container, FIG. 12B is a perspective view illustrating the impact detector 100 attached to the packaging container shown in FIG. 12A, and FIG. 12C is a cross-sectional view illustrating the attached state of the impact detector 100.

Referring to FIG. 12A, a packaging container 700 according to the present embodiment includes a cardboard box 710 having a side surface 720 on which the impact detector 100 is attached. An opening 730 can be formed in the side surface 720 of the cardboard box 710 so that the impact detector 100 can fit in the opening 730 and attached to a vertical plane of an object stored in the packaging container 700.

To fit the impact detector 100 in the side surface 720 of the cardboard box 710, it is preferred to provide that the rear case 200 should include the flange portion 240 and the front case 400 should include overhang portions 480 and a lower projecting portion 490 as illustrated in FIG. 12B. With this configuration, a lower portion of the impact detector 100 is engaged in the opening portion 730 such that the flange portion 240 and the lower projecting portion 490 sandwich a lower edge portion 720a of the opening portion 730 as shown in FIG. 12C, and the overhang portions 480 fully contacts the outer surface of the side surface 720. Thereafter, the sealing member 740 is attached to cover the impact detector 100. Thereby, the impact detector 100 is reliably attached to the packaging container 700. Further, it is possible to prevent falsification, i.e., to prevent someone from removing the impact detector 100 from the cardboard box 710 and resetting the weights to the initial state when the cardboard box 710 receives an impact. In this case, it is preferred that an adhesive surface of the sealing member 740 includes a material containing glue so that the glue can be partly transferred and adheres to the surface of the front case 400 when the sealing member 740 is removed. Thereby, it is possible to check whether or not the impact detector 100 has been unsealed for falsification.

Next, an impact detector according to a second embodiment will be described below with reference to FIGS. 13 and 14.

Figure 13:
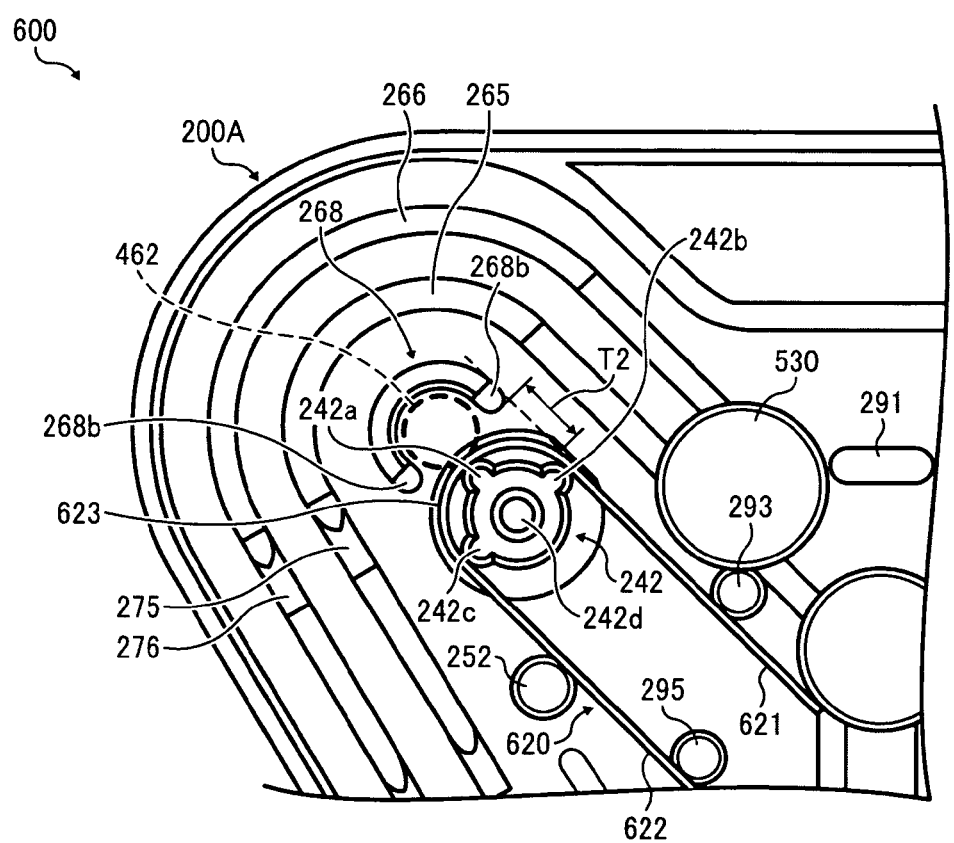
FIG. 13 is an enlarged plan view of a portion of an impact detector according to a second embodiment.

FIG. 13 is an enlarged plan view illustrating a portion of the impact detector according to the second embodiment.

Referring to FIG. 13, an impact detector 600 according to the present embodiment is similar in structure to the impact detector 100 according to the first embodiment, except that the impact detector 600 uses two planar members 620 each including a folded portion 623 different in shape from the folded portions 313 and 323 of the planar members 310 and 320 according to the first embodiment. The two planar members 620 are symmetrical, and thus the following description will be made of only the planar member 620 on the left. The planar member 620 of the present embodiment includes flat planar first and second holding members 621 and 622 and the semicircular folded portion 623. The entirety of the planar member 620 is formed into a substantially rounded U-shape.

When planar member 620 is installed in a rear case 200A, the folded portion 623 is in contact with the sandwiching projection 242a and the contact projections 242b and 242c of the first left supporting member 242, and is sandwiched by the sandwiching projection 242a and the pressing member 462 formed in the front case 400. Further, the first holding member 621 is in contact with the weight supporter 293, and the second holding member 622 is in contact with the second left supporting member 252 and the positioning member 295. Similarly to the impact detector 100 according to the first embodiment, the impact detector 600 according to the present embodiment is also capable of detecting an impact with relatively high accuracy. In the impact detector 600 according to the present embodiment, although the distance of a gap T2 between an end portion of the arc-shaped member 268 and the folded point between the first holding member 621 and the folded portion 623 is greater than the distance of the gap T1 of the first embodiment (see FIG. 8) because the folded point is not angled but is rounded, the third weight 530 can move from the first holding member 621 to the arc shaped member 268 smoothly.

Comparison between the behaviors of the planar member 320 in the first embodiment with that of the planar member 620 in the second embodiment is described below with reference to FIGS. 14A through 14D.

Figure 14A:
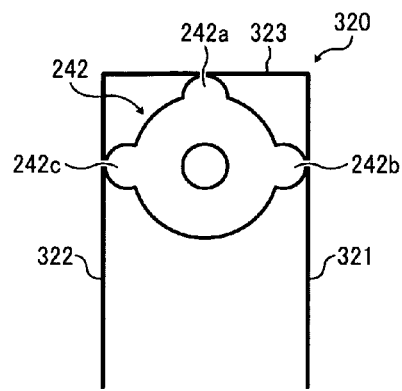
FIGS. 14A and 14B are schematic diagrams illustrating states of the planar member according to the first embodiment.
Figure 14B:
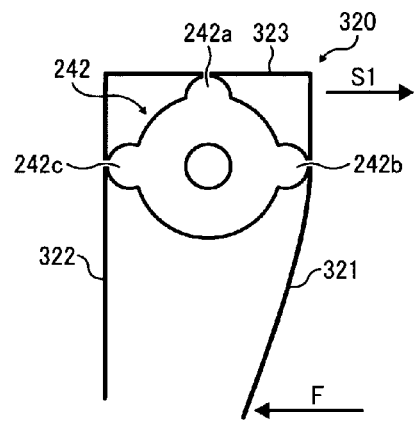
Figure 14C:
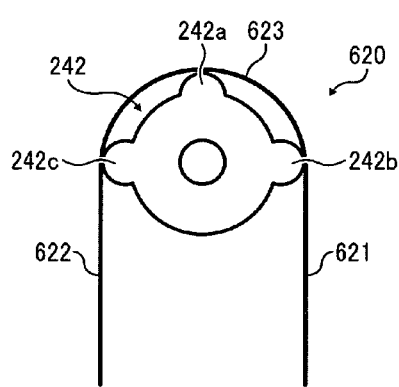
FIGS. 14C and 14D are schematic diagrams illustrating states of the planar member according to the second embodiment.
Figure 14D:
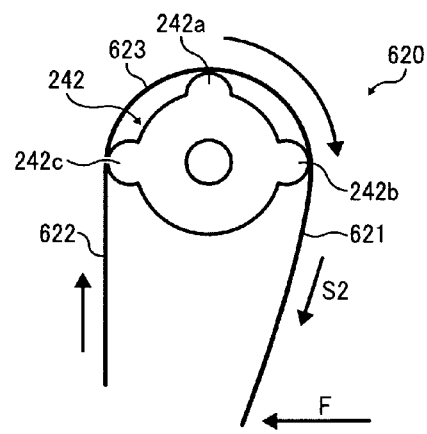

FIGS. 14A and 14B are schematic diagrams illustrating the behavior of the left planar member 320 according to the first embodiment, and FIGS. 14C and 14D are schematic diagrams illustrating the behavior, of the planar member 620 according to the second embodiment.

In the first embodiment, no members are in contact with the left planar member 320 between the sandwiching projection 242a and the contact projection 242b. Therefore, when the first holding member 321 is deformed downward (to the left in FIGS. 14A and 14B) by an external force F applied thereto, the portion of the left planar member 320 between the sandwiching projection 242a and the contact projection 242b receives force in the direction along the circumference (direction of rotation) of the first left supporting member 242, and generates externally expanding force S1 as shown in FIG. 14B.

By contrast, when the external force F is applied the first holding member 621 in the second embodiment illustrated in FIG. 14C, because the folded portion 623 is rounded, the first holding member 621 directly receives a force S2 in the direction indicated by an arrow shown in FIG. 14D, and then the entire planar member 620 is pulled in the direction of torsional rotation and can expand externally.

By contrast, in the first embodiment, the folded portion 323 and the first holding member 321 form a substantially L-shape. Therefore, when the first holding member 321 receives the external force F, the portion of the left planar member 320 between the sandwiching projection 242a and the contact projection 242b receives the force S1 and can maintains the substantially L-shape. As a result, the portion between the sandwiching projection 242a and the contact projection 242b deform in the direction of the force S1 deforms to only a limited degree if any. Accordingly, the first embodiment is capable of suppressing an unexpected deformation of the planar members more effectively and increasing the accuracy of the impact detector than the second embodiment.

Figure 15:
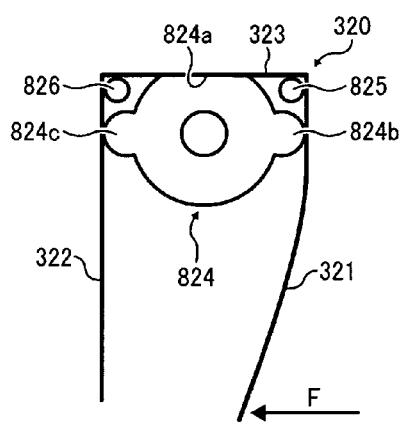
FIG. 15 is a schematic diagram illustrating a variation of a first supporting member used in the impact detector according to the first embodiment.

FIG. 15 is a schematic diagram illustrating a variation of the first supporting member in the impact detector 100 according to the first embodiment.

In consideration of the above-described behavior of the left planar member 320, instead of the first right and left supporting members 241 and 242 in the first embodiment, the present variation uses a pair of symmetrical first supporting members 824 each including a flat portion 824a formed on its upper side. The flat portion 824a is in contact with the folded portion 323. Additionally, in the present variation, two holding portions 825 and 826 are provided. The holding portion 825 is disposed inside a corner (folded point) formed by the folded portion 323 and the first holding member 321 in contact with the first holding members 321, and the holding portion 826 is disposed inside a corner (folded point) formed by the folded portion 323 and the second holding member 322 in contact with the second holding member 322. The present embodiment prevents unnecessary deformation of the left planar member 320, and thus provides an impact detector with higher detection accuracy.

Next, an experiment conducted to compare the impact detection according to the first embodiment with the impact detection according to the second embodiment is described below.

In the experiment, the type (the diameter and thickness in this case) of the weight and the type (the thickness, width, and length in this case) of the leaf spring forming the planar member were changed as required. The experiment was conducted under the following conditions:

Packaged freight—Conditioning for testing (JIS Z 0203: 2000);

Standard Test Methods for Programmable Horizontal Impact Tests for Shipping Containers and Systems (ASTMD 4003: 92), Packaged freight—General rules of testing (JIS Z 0200: 1999);

Methods of designating on component parts and points of containers when testing (JIS Z 0201: 1989);

Method of drop test for packaged freight (JIS Z 0202: 1994); and

ISTA Package Project-1 Pre-Shipment Test Procedures (Revised January 1984).

The following apparatus was used for the experiment.

An overview of the apparatus is as follows: The apparatus includes an impact table, on which a test sample is placed. The impact table is moved by a hoist provided to an upper portion of a pillar of the impact table. The position of the impact table is set by an electronically controlled nitrogen gas hydraulic brake system. The brake is released to make the impact table free-fall and hit against a programmer. An impact waveform and a response waveform can be monitored by waveform analysis software "Test Partner" installed on an impact test system.

The apparatus is used for, for example, test for drop impact strength of packaged freight and transportation simulation test, standard test of a standard such as JIS Z 0119 and ASTM-D3332, in-transit transshipment and handling simulation test, test for drop impact strength of product (damage boundary) and transportation simulation test, and non-packaged recalled product transportation test.

Model 122 of the apparatus is designed for use in testing a relatively large product or unit. Model 65/81 of the apparatus is designed for use in testing a relatively small product or unit.

Basic specifications of the apparatus used in the experiment are as follows:

Manufacturer: Lansmont Corporation (U.S.A.)

Model: Model 122 (for relatively large product or unit)

Dimensions of impact table: 1220 millimeters by 1220 millimeters

Maximum loading mass: 455 kilograms

Impact waveform (maximum acceleration): half sine wave (5.9 kilometers per square second) and trapezoidal wave (1.5 kilometers per square second)

Maximum velocity change: 7.6 meters per second

Waveform generator: high-pressure nitrogen gas programmer (150 bars)

Waveform analysis software: Test Partner

Figure 16A:
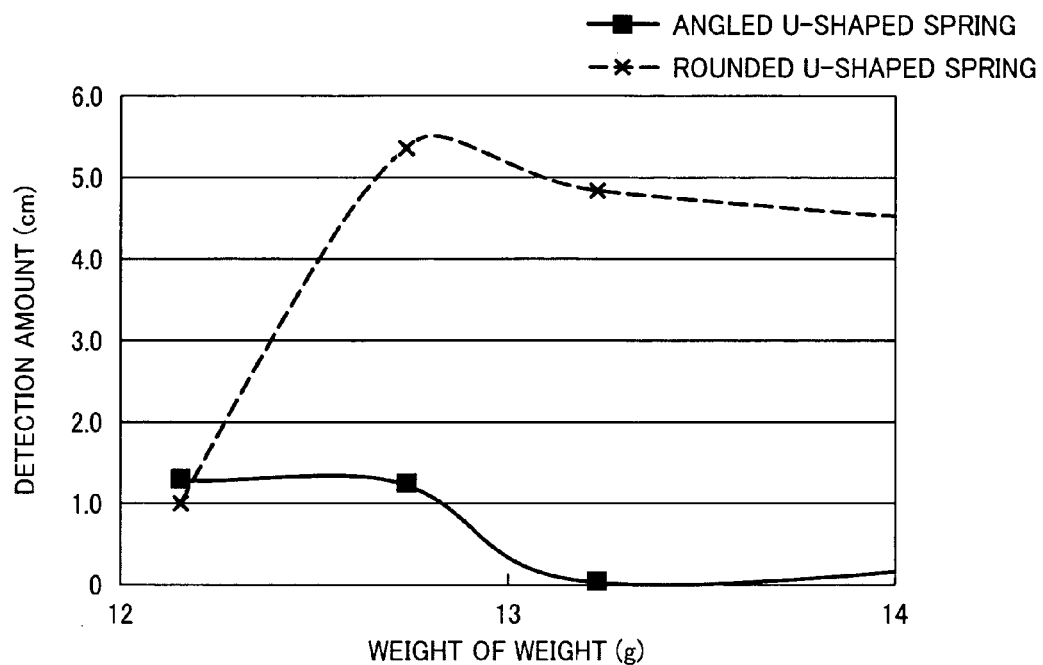
FIG. 16A is a graph illustrating the relationship between the weight and differences in impact detection amount between upper and lower holding members of the planar elastic member.
Figure 16B:
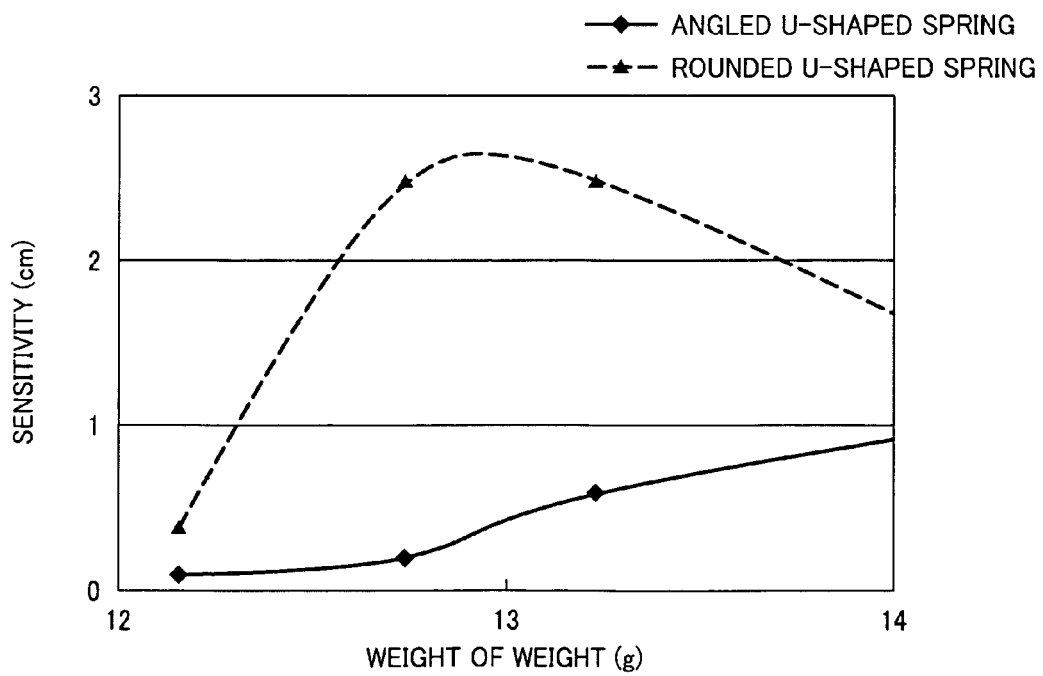
FIG. 16B is a graph illustrating the relationship between the weight in grams of a weight and the response sensitivity in impact detection.

FIGS. 16A and 16B illustrate results of the experiment.

FIG. 16A illustrates graphs each representing the relationship between the weight of the weight and differences in impact detection amount between the upper and lower holding members of the planar member. FIG. 16B illustrates graphs each representing the relationship between the weight of the weight and the response sensitivity in the impact detection.

As illustrated in FIG. 16A, when the difference in detection height between the upper and lower holding members is compared between the first and second embodiments, the difference tends to be smaller in the planar members 310 and 320 according to the first embodiment (i.e., the substantially angled U-shaped spring) than in the planar members 620 according to the second embodiment (i.e., the substantially U-shaped spring). Each of the planar members 310, 320, and 620 is set such that the upper holding members (311, 321, and 621) detect the same height and lower holding members (312, 322, and 622) detect the same height. With this taken into account, it is understood that the planar members 310 and 320 according to the first embodiment can be set more easily to a value close to the intended detection height and thus have higher detection accuracy than the planar members 620 according to the second embodiment. Further, as illustrated in FIG. 16B, the superiority in sensitivity of the first embodiment was also confirmed from the result of conversion of the response sensitivity in the impact detection into the drop height.

Next, a third embodiment of the present invention will be described below.

Figure 17:
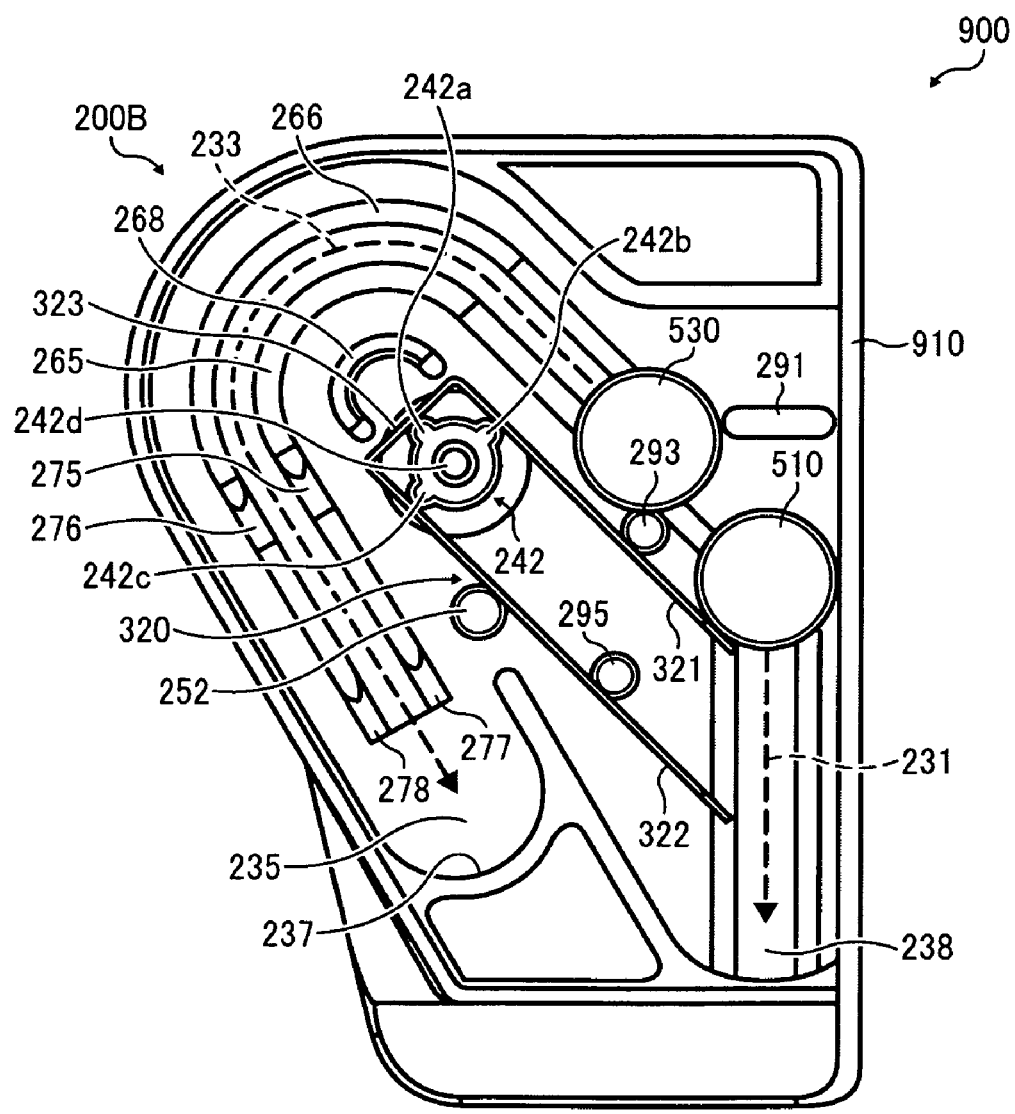
FIG. 17 is a plan view illustrating a rear case of an impact detector according to a third embodiment.

FIG. 17 is a plan view illustrating from a front side a rear case of an impact detector according to the third embodiment.

An impact detector 900 according to the present embodiment has a configuration similar to the left half of the impact detector 100 according to the first embodiment described above. The present embodiment is similar to the first embodiment in other configurations. Therefore, the corresponding components of the present embodiment will be designated by the reference numerals of the first embodiment, and description thereof will be omitted.

In the present embodiment, the first weight 510 is held by the left planar member 320 and a wall portion 910 of a rear case 200B. With a drop impact, the first weight 510 moves through the vertical transition path 231 while deforming the first holding member 321 and the second holding member 322. Further, with a tilt to one side (to the left in FIG. 17), the third weight 530 moves through the left transition path 233.

According to the impact detector 900 of the present embodiment, it is possible to detect two drops and a tilt to one side with a simple configuration.

Next, a fourth embodiment of the present invention will be described below with reference to FIGS. 18A through 18C.

Figure 18A:
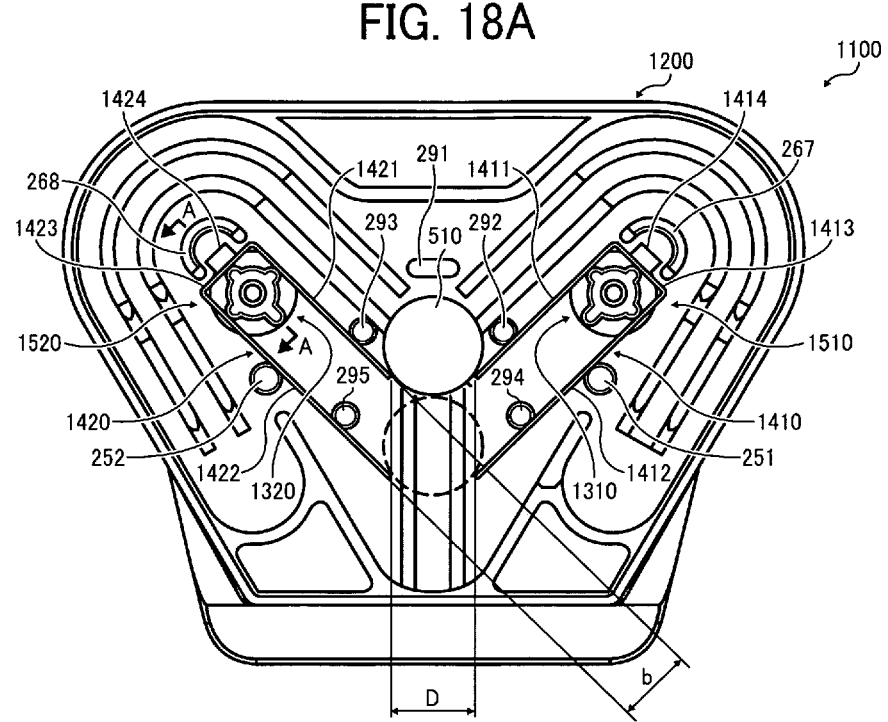
FIG. 18A is a plan view illustrating a rear case of an impact detector according to a fourth embodiment.
Figure 19A:
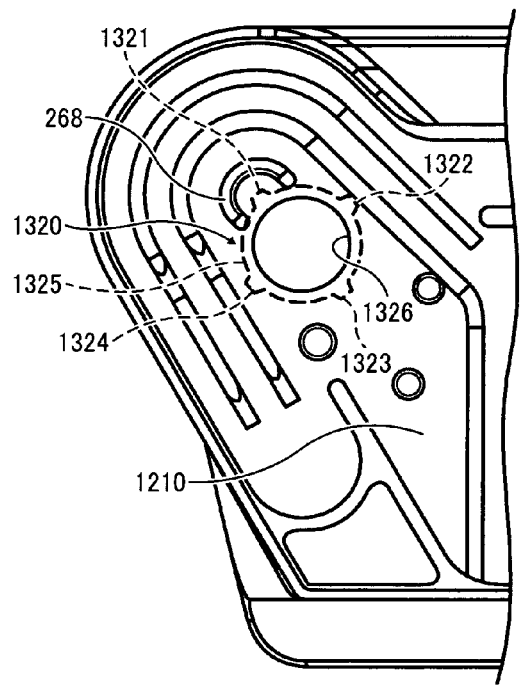
FIGS. 19A and 19B are respectively a front view and a rear view of illustrating a left portion of the rear case shown in FIG. 18A.
Figure 19B:
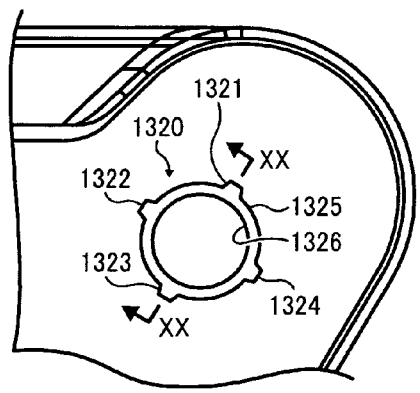
Figure 20:
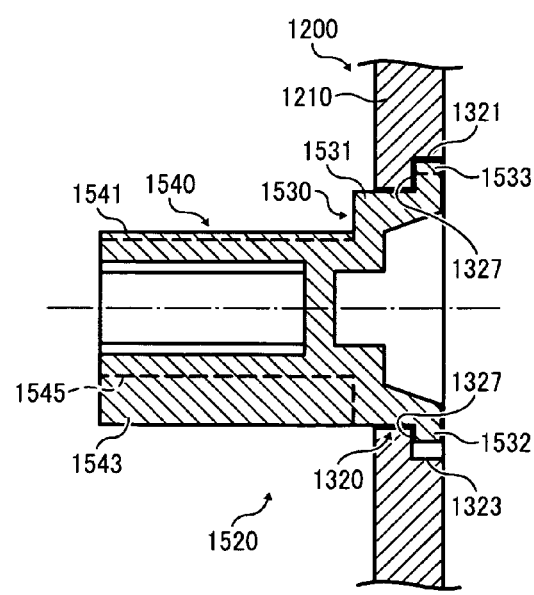
FIG. 20 is a cross-sectional view along a line XX-XX in FIG. 19B, illustrating a first supporting member attached in the rear case.

FIG. 18A is a plan view illustrating a state of an impact detector 1100 according to the fourth embodiment, in which planar members 1410 and 1420 and a first weight 510 are arranged in a rear case 1200. FIG. 18B is an end elevation view of the impact detector 1100 shown in FIG. 18A, as viewed in a direction A indicated in FIG. 18A. FIG. 18C is an enlarged perspective view of the planar member 1420 used in the impact detector 1100. FIGS. 19A and 19B are diagrams illustrating a configuration of the rear case. FIG. 19A is a front view illustrating a left portion of the rear case 1200. FIG. 19B is a rear view of the left portion of the rear case 1200. FIG. 20 is a cross-sectional view of the rear case 1200 cut along a line XX-XX in FIG. 19B. It is to be noted that, in FIG. 18A, the second weight 520 and the third weight 530 are omitted in simplicity.

An impact detector 1100 according to the present embodiment includes, as independent members, first right and left supporting members 1510 and 1520 (columnar members) attached to a rear case 1200. The first supporting members 1510 and 1520 respectively engage engagement portions 1310 and 1320 formed in the rear case 1200. The first supporting members 1510 and 1520 can be attached to the engagement portions 1310 and 1320 at one of multiple different angle positions to change the positions of planar members 1410 and 1420 for supporting the first weight 510. Accordingly, it is possible to adjust of the effective lengths of the planar members 1410 and 1420 to a certain extent, thus adjusting the dimension D of a gap for holding the first weight 510.

Figure 18B:
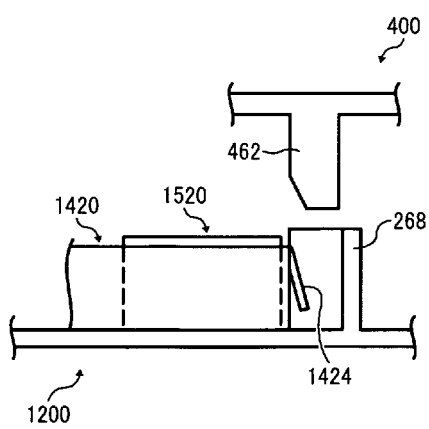
FIG. 18B is a cross-sectional view of an end portion of the impact detector shown in FIG. 18A, as viewed in a direction A indicated in FIG. 18A.
Figure 18C:
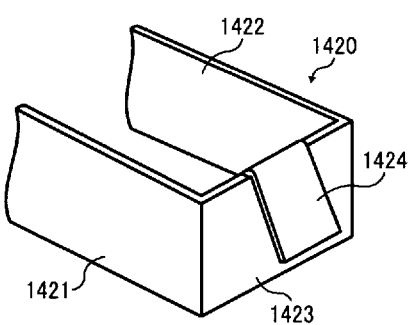
FIG. 18C is an enlarged perspective view of a planar member used in the impact detector shown in FIG. 18A.

In the present embodiment, as illustrated in FIGS. 18A and 18B, when the planar members 1410 and 1420 are attached to the case, initially the planar members 1410 and 1420 are respectively provided adjacent to the first supporting members 1510 and 1520 provided in the rear case 1200, and then the planar members 1410 and 1420 are respectively pressed by the pressing members 461 and 462 of the front case 400, which engage with the arc-shaped members 267 and 268, respectively. Thereby, the second end portion (upper right side in FIG. 18A) of the planar member 1410 is fixed in the rear case 1200, and the second end portion (upper left side in FIG. 18A) of the planar member 1420 is fixed in the rear case 1200. It is to be noted that, with this state, the first end portion of the planar members 1410 and 1420 to hold the weight 510 is movable, deformed by the weight 510. The rear case 1200 is similar in configuration to the rear case 200 described in the first embodiment, except that the rear case 1200 includes the engagement portions 1310 and 1320 formed therein. Therefore, main components of the present embodiment are designated by the reference numerals of the first embodiment, and description thereof will be omitted.

With the minor positional adjustment of the planar member 1410 as described above, it is possible to deal with the variation in the length (e.g., ±0.15 millimeters) of the planar member 1410, i.e., a leaf spring, occurring in the processing of the planar member 1410. With this adjustment, it is possible to increase the accuracy of the impact detection height, and thus to guarantee the detection performance. Further, with this configuration, drop detection height can be changed.

Next, the engagement portions 1310 and 1320 will be described below.

The engagement portions 1310 and 1320 formed in the rear case 1200 are similar in configuration. Therefore, the following description will be made of only the engagement portion 1320 provided on the left side in FIG. 18A. As illustrated in FIGS. 19A, 19B, and 20, the engagement portion 1320 is formed in a bottom plate 1210 of the rear case 1200. The engagement portion 1320 includes a small-diameter portion 1326 formed in the front surface of the bottom plate 1210 and a large-diameter portion 1325 formed in the rear surface of the bottom plate 1210, creating a step portion 1327 as shown in FIG. 20. Further, to set the angle position of the first supporting member 1520, the large-diameter portion 1325 include four locking holes 1321, 1322, 1323, and 1324 formed at intervals of approximately 90 degrees.

Next, the planar members 1410 and 1420 will be described below.

The planar members 1410 and 1420 are bilaterally symmetric. Therefore, the following description will be made of the planar member 1420 on the left side in FIG. 18A. The planar member 1420 is formed by a thin stainless steel plate cut and folded. As illustrated in FIG. 18C, the planar member 1420 includes a first holding member 1421, a second holding member 1422, a folded portion 1423 connecting the first holding member 1421 and the second holding member 1422, and an elastic piece 1424 extending from and folded back from the folded portion 1423. When the planar member 1420 is positioned adjacent to the first supporting member 1520 attached to the rear case 1200, the folded portion 1423 is sandwiched by the pressing member 462 and the first supporting member 1520. In this state, the elastic piece 1424 biases the planar member 1420 toward the first supporting member 1520 such that the planar member 1420 is reliably held between the pressing member 462 and the first supporting member 1520.

It is to be noted that in the planar member 1420, instead of providing the elastic piece 1424, an elastic portion for pressing the folded portion 1423 of the planar member 1420 may be provided on another member, e.g., the pressing member 462 of the front case 400.

Next, the first supporting members 1510 and 1520 (columnar members) will be described below.

Figure 21A:
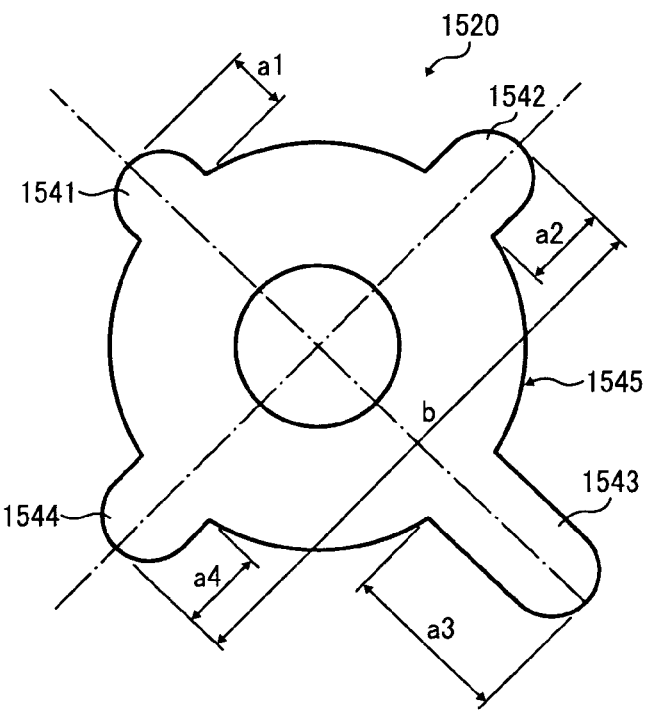
FIG. 21A is an enlarged plan view illustrating a first supporting member of the fourth embodiment.
Figure 21B:
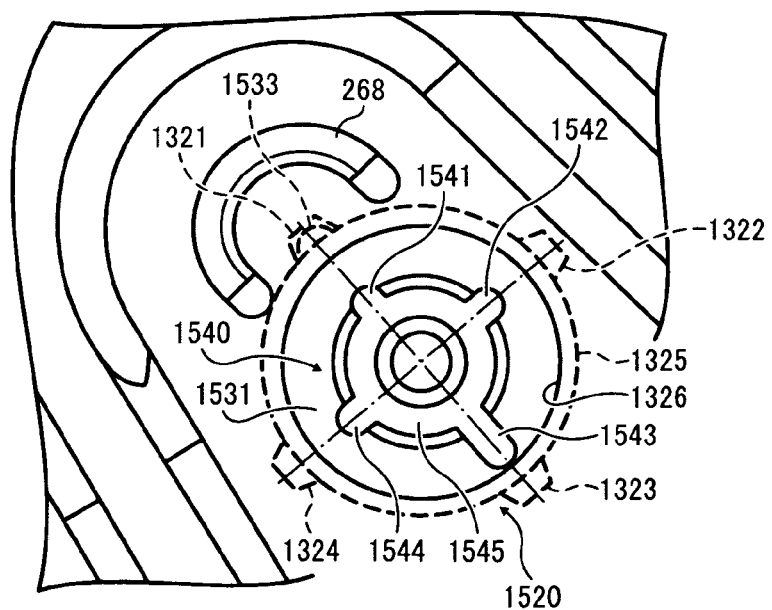
FIG. 21B is a plan view illustrating the first supporting member shown in FIG. 21A, attached to an engagement portion formed in the rear case.
Figure 22:
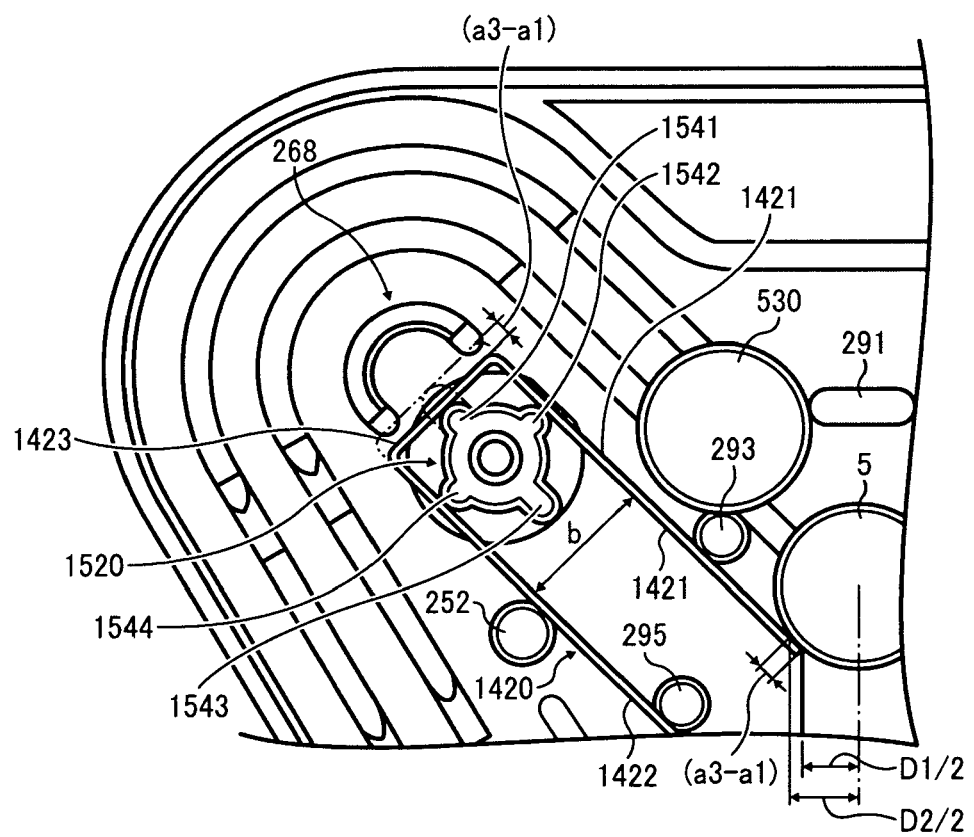
FIG. 22 is a plan view illustrating a planar elastic member attached to the rear case.

FIGS. 21A and 21B illustrate the first supporting member 1520 of the fourth embodiment. FIG. 21A is an enlarged plan view of a holding member length adjusting portion. FIG. 21B is a plan view illustrating the attached state of the first supporting member 1520. FIG. 22 is a plan view illustrating the attached state of the planar member 1420. The first supporting members 1510 and 1520 are similar in configuration. Therefore, the following description will be made of only the first supporting member 1520 on the left side in FIG. 18A.

As illustrated in FIGS. 20, 21A, and 21B, the first supporting member 1520 includes a base portion 1530 that fits in the engagement portion 1320 of the rear case 1200, and a holding member length adjusting portion 1540 having a cylindrical shape and extending upright from the base portion 1530. The base portion 1530 includes a small-diameter base portion 1531 which fits in the small-diameter portion 1326 of the engagement portion 1320, and a large-diameter base portion 1532 which fits in the large-diameter portion 1325 of the engagement portion 1320. The large-diameter base portion 1532 includes a locking projection 1533 which can fit in one of the locking holes 1321, 1322, 1323, and 1324 of the engagement portion 1320. When the first supporting member 1520 is inserted in the engagement portion 1320, the locking projection 1533 fixes the first supporting member 1520 to the rear case 1200 by engaging one of the locking holes 1321, 1322, 1323, and 1324. The first supporting member 1520 can be attached to the rear case 1200 by a publicly known engagement method such as snap-fitting.

It is to be noted that, alternatively, the large-diameter portion 1325 and the small-diameter portion 1326 may be formed on the front surface and the rear surface of the rear case 1200, respectively, and the small-diameter base portion 1531 and the large-diameter base portion 1532 may be formed to fit in the thus configured small-diameter portion 1326 and large-diameter portion 1325, respectively. In this configuration, the first supporting members 1510 and 1520 can be attached from the front side of the rear case 1200.

Further, the holding member length adjusting portion 1540 includes four projections 1541, 1542, 1543, and 1544 radially projecting in four directions from the circumferential surface of a cylindrical member 1545 extending upright from the based portion 1530. As illustrated in FIG. 21A, in the present embodiment, a1 represents the length of the projection 1541, a2 represents the length of the projection 1542, a3 represents the length of the projection 1543, and a4 represents the length of the projection 1544, and these projecting lengths satisfy a1<a3 and a2=a4. Thus, the fixing member to fix the planar members 1410 and 1420 include the columnar member having projections of predetermined projecting lengths.

Further, in the present embodiment, the distance (indicated by arrow b shown in FIG. 21A) between the outer end of the projection 1542 and the outer end of the projection 1544 is equal to the distance (indicated by arrow b shown in FIG. 22) between the first holding member 1421 and the second holding member 1422.

Further, in the present embodiment, the first supporting member 1520 can be attached in the engagement portion 1320 such that the locking projection 1533 is locked by one of the locking holes 1321 and 1323 of the engagement portion 1320. When the first supporting member 1520 is attached in the engagement portion 1320 such that the locking projection 1533 is locked by the locking hole 1321 as illustrated in FIG. 22, the projection 1541 is on the side of the arc-shaped member 268 to be in contact with the folded portion 1423 of the planar member 1420 while the projection 1543 is not in contact with the planar member 1420. At this angle position, the projections 1542 and 1544 are in contact with the first holding member 1421 and the second holding member 1422, respectively. Thus, the gap of a distance b shown in FIG. 22 is maintained between the first holding member 1421 and the second holding member 1422. In this state, the gap between a lower end of the first holding member 1421 of the planar member 1420 and a lower end of the first holding member 1411 of the planar member 1410 is set at a distance D1 (FIG. 22 illustrates a distance D1/2).

By contrast, when the first supporting member 1520 is positioned in the engagement portion 1320 with the locking projection 1533 locked by the locking hole 1323, the projection 1543 is on the side of the arc-shaped member 268 to be in contact with the folded portion 1423 of the planar member 1420 while the projection 1541 is not in contact with the planar member 1420. At this angle position, the projections 1542 and 1544 are in contact with the second holding member 1422 and the first holding member 1421, respectively, and thus the gap of the distance b is kept between the first holding member 1421 and the second holding member 1422. In this state, the gap between the lower end of the first holding member 1421 of the planar member 1420 and the lower end of the first holding member 1411 of the planar member 1410 has a distance D2 (FIG. 22 illustrates a distance D2/2).

Thus, the projections 1541 and 1543 together form a pair of adjusting projections of unequal length to adjust the effective length of the planar elastic member 1420. The projections 1542 and 1544 together form a pair of spacing projections to maintain the distance between the first 1421 and the second arm 1422 of the planar elastic member 1420.

Therefore, when the angle position of the first supporting member 1520 is changed from the state shown in FIG. 22 to the state in which the projection 1543 is on the side of the arc-shaped member 268, the first holding member 1421 and the second holding member 1422 can move by a distance (a3−a1) in the direction in which they extend (extending direction). Thereby, the positions of the respective lower ends of the first holding member 1421 and the second holding member 1422 can move by the same distance of (a3−a1). Accordingly, the gap formed by the planar members 1410 and 1420 to hold the first weight 510 can be adjusted to either the distance D1 or D2.

Thus, in the present embodiment, the variation in length of the springs due to the variation in processing accuracy of the planar members 1410 and 1420 can be adjusted by changing the angle position (attached state) of the first supporting members 1510 and 1520. This can guarantees the detection performance when receiving an impact of a set magnitude. Further, it is possible to change the detection height, depending on the amount by which the position of the planar members 1410 and 1420 is adjusted.

As described above, according to the present embodiment, it is possible to adjust the variation in length of the leaf springs forming the planar members 1410 and 1420 and to reduce the fluctuation in impact reactivity of the sensor provided to the outer box, caused by differences in characteristics of packaged freights. Accordingly, an enhanced detection performance can be guaranteed at relatively low cost without an increase in the number of components.

It is to be noted that, although the shape of the first supporting members 1510 and 1520 is the figures of the present specification is cylindrical with multiple projections projecting radially from its circumference, the first supporting members 1510 and 1520 are not limited thereto, and may be polygonal columnar or the like having irregular circumference.

Next, a fifth embodiment of the present invention will be described below.

Figure 23A:
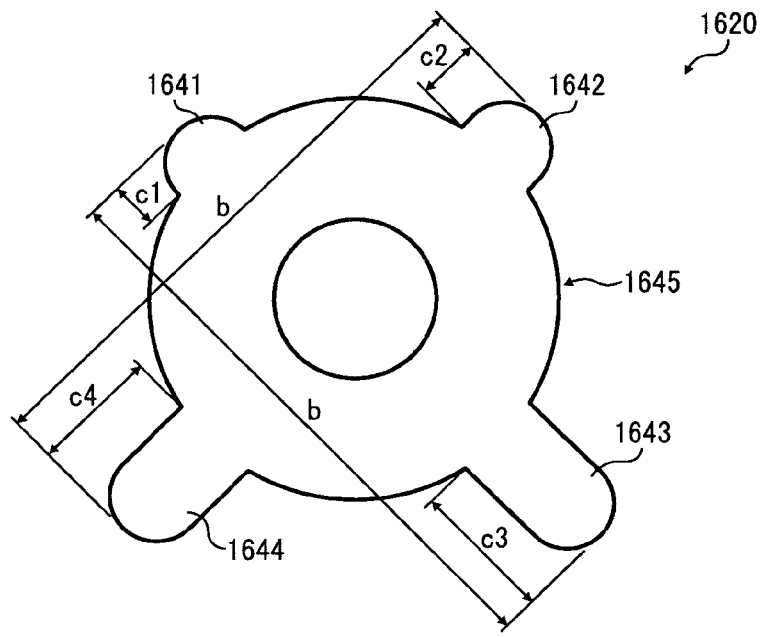
FIG. 23A is an enlarged plan view illustrating a first supporting member of a fifth embodiment.
Figure 23B:
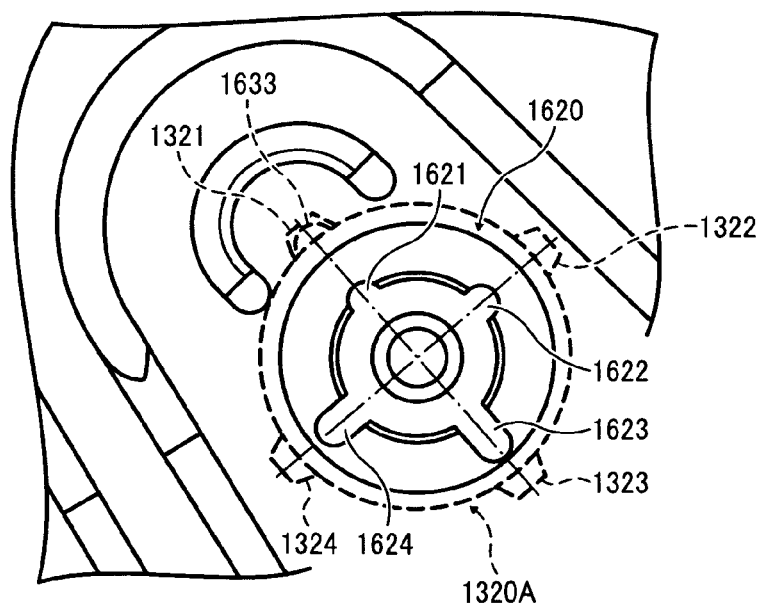
FIG. 23B is a plan view illustrating the first supporting member shown in FIG. 23A, attached to the rear case.

In an impact detector according to the present embodiment, the effective length of the planar members 1410 and 1420 can be set to one of four different lengths using a first supporting member (columnar member) 1620 shown in FIGS. 23A and 23B. FIG. 23A is an enlarged plan view of a holding member length adjusting portion of the first supporting member (columnar member) 1620, and FIG. 23B is a plan view illustrating an angle position (attached state) of the first supporting member 1620.

In place of the first supporting members 1510 and 1520 according to the fourth embodiment, the impact detector according to the present embodiment uses first supporting members 1620 illustrated in FIGS. 23A and 23B (only the left-side first supporting member 1620 is illustrated in the drawings), serving as columnar members each having an irregular circumference. As first supporting member 1620 on the right and left are symmetrical, the following description will be made of only the first supporting member 1620 on the left.

As illustrated in FIG. 23A, the first supporting member 1620 according to the present embodiment includes four projections 1641, 1642, 1643, and 1644 formed on the circumference of a cylindrical member 1645 and having different projection lengths c1, c2, c3, and c4, respectively, from the cylindrical member 1645. In the configuration shown in FIGS. 23A and 23B, c1<c2<c4<c3, and the distance between the outer end of the projection 1641 and the outer end of the projection 1643 equals the above-described distance b between the first holding member 1421 and the second holding member 1422, and the distance between the outer end of the projection 1642 and the outer end of the projection 1644 equals the above-described distance b similarly.

Further, in the present embodiment, the first supporting member 1620 is attached in an engagement portion 1320A shown in FIG. 23B at an angle position at which one of the projections 1641, 1642, 1643, and 1644 is in contact with the folded portion 1423 of the planar member 1420. Referring to FIG. 23B, in this case, a projection 1633 of the first supporting member 1620 is locked by one of the locking holes 1321, 1322, 1323, and 1324 of the engagement portion 1320A. Thereby, the first holding member 1421 and the second holding member 1422 can be set at one of four positions in the extending direction thereof. Although the planar members 1410 and 1420 can rotate slightly, depending on the angle positions at which the first supporting members 1610 and 1620 are attached, the following discussion will be made with this rotation taken into account.

In the present embodiment, the distance of the gap between the first holding member 1411 (not illustrated) of the planar member 1410 and the first holding member 1421 of the planar member 1420 can be set to one of four values, i.e., distances G1, G2, G3, and G4 when the folded portion 1423 is in contact with the projection 1641, 1642, 1643, and 1644, respectively. In the configuration shown in FIGS. 23A and 23B, G3>G4>G2>G1. If the respective holding members of the two planar members 1410 and 1420 are the same in dimension, the gap between the second holding members 1412 and 1422 has the same distance as described above. According to the present embodiment, therefore, it is possible to correct the variation in length of the springs, which is caused by the variation in processing accuracy of the planar members 1410 and 1420, by adjusting the angle position (attached state) of the first supporting members 1610 and 1620, and the detection performance of an impact of a set magnitude can be guaranteed.

Thus, each of the two projections 1641 and 1643 and the other two projections 1642 and 1644 serve as a pair of projections having different lengths, and the distance between circumferences of the two projections facing each other equals the distance between the first arm 1421 and the second arm 1422 of the planar member 1420. With this configuration, the distance therebetween can be kept constant even when the position of the planar member 1420 holding the weight is changed. Because the projections 1641 through 1644 are different in the projecting length, the position of the planar member 1420 can be adjusted more suitably.

Further, in the present embodiment, if the projection length of each of the projections of the first supporting members 1610 and 1620 is preset to a predetermined value, it is possible to change the detection height of the impact detector without changing the planar members 1410 and 1420.

Figure 24:
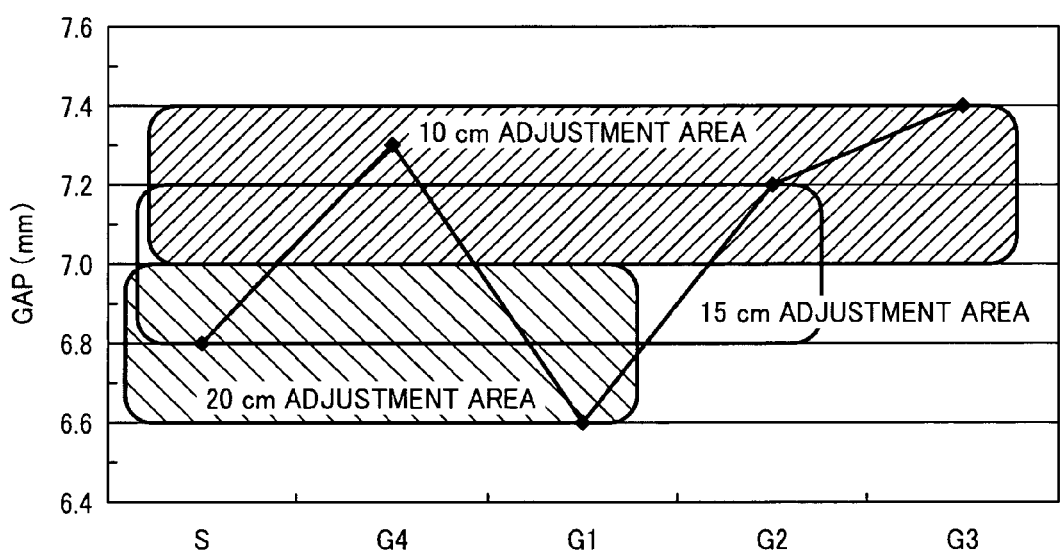
FIG. 24 is a diagram illustrating distances of a gap between right and left planar members in the fifth embodiment.

FIG. 24 is a diagram illustrating distances of the gap between the planar members 1410 and 1420 in the impact detector according to the fifth embodiment.

Herein, the planar members 1410 and 1420 have a margin of dimensional error of approximately ±0.15 millimeters. Due to this margin of dimensional error, the distance of the gap has a margin of dimensional error of approximately ±0.4 millimeters. That is, the gap has a distance of approximately 7±0.4 millimeters, i.e., approximately 6.6 millimeters to approximately 7.4 millimeters. In this state, the present embodiment is capable of changing the angle position of the first supporting members 1510 and 1520 in the engagement portion 1320A to set the gap (distance) to four values, i.e., a gap G4 of approximately 7.3 millimeters, a gap G1 of approximately 6.6 millimeters, a gap G2 of approximately 7.2 millimeters, and a gap G3 of approximately 7.4 millimeters. FIG. 24 also illustrates, as a comparative embodiment, a gap S of approximately 6.8 millimeters used for a drop detection height of approximately 20 centimeters.

As illustrated in FIG. 24, the present embodiment compensate for the dimensional error of the planar members 1410 and 1420 as follows.

If the respective angle positions of the first supporting members 1610 and 1620 are set to correspond to a drop detection height of approximately 10 centimeters, the present embodiment can compensate for the dimensional error by setting the gap to one of the gap (distances) G4, G2, and G3. If the angle positions of the first supporting members 1610 and 1620 are set to correspond to a drop detection height of approximately 15 centimeters, the present embodiment can compensate for the dimensional error by setting the gap to the gap G2. Further, if the angle positions of the first supporting members 1610 and 1620 are set to correspond to the drop detection height of approximately 20 centimeters, the present embodiment can compensate for the dimensional error by setting the gap to the gap G1.

The above-described embodiments are illustrative and do not limit the present invention. Thus, numerous additional modifications and variations are possible in light of the above teachings. For example, elements at least one of features of different illustrative and exemplary embodiments herein may be combined with each other at least one of substituted for each other within the scope of this disclosure and appended claims.

Further, features, such as the number, position, and shape, of components of the embodiments are not limited the embodiments and thus may be preferably set. It is therefore to be understood that within the scope of the appended claims, the disclosure of this patent specification may be practiced otherwise than as specifically described herein.

What is claimed is:

1. An impact detector comprising:
a weight having a circular periphery;
a case in which the weight is contained, an interior of which defines a transition path through which the weight moves when the case receives an impact of a predetermined magnitude in a first direction;
a planar elastic member disposed on a first side of the case, extending in the case with a first end portion oriented in a direction in which the weight moves when the case receives the impact in the first direction,
the planar elastic member including,
a folded portion disposed on a second end portion of the planar elastic member opposite to the first end portion of the planar elastic member,
a first arm bent and extending from a first end portion of the folded portion, including an end portion holding the weight at an initial position in the transition path, the first arm deforming to release the weight when the case receives the impact of the predetermined magnitude in the first direction, and
a second arm extending from a second end portion of the folded portion opposite the first end portion from which the first arm extends; and
a fixing member to fix the planar elastic member to the case, the fixing member including,
a sandwiching portion to sandwich the folded portion of the planar elastic member from both sides, and
a contact portion to prevent the planar elastic member from moving in the direction in which the weight moves by contacting the first arm and the second arm of the planar elastic member.

2. The impact detector according to claim 1, wherein the folded portion of the planar elastic member is linear, and the planar elastic member is angled U-shaped.

3. The impact detector according to claim 2, wherein the case includes a rear case in which the transition path is formed and a front case covering the rear case, and
the sandwiching portion of the fixing member includes,
a first projection provided in the rear case, in contact with the folded portion of the planar elastic members,
a second projection provided in the front case disposed across the folded portion from the first projection, to sandwich the folded portion with the first projection, and
a guide portion provided in the rear case, to guide the second projection when the front case is engaged with the rear case.

4. The impact detector according to claim 3, wherein the guide portion of the fixing member includes a tilted surface disposed at an end portion thereof facing the first projection, tilted downward toward the first projection.

5. The impact detector according to claim 3, wherein, when the case is tilted to the first side, the first arm of the planar elastic member guides the weight to the first side, and
the guide portion of the fixing member guides the weight guided by the first arm of the planer elastic member further in a predetermined direction.

6. The impact detector according to claim 5, wherein the guide portion of the fixing member includes a tilted surface disposed at an end portion thereof facing the first projection, tilted downward toward the first projection.

7. The impact detector according to claim 1, wherein the case includes a rear case in which the transition path is formed and a front case covering the rear case, and
the sandwiching portion of the fixing member includes,
a first projection provided in the rear case, in contact with the folded portion of the planar elastic members,
a second projection provided in the front case disposed across the folded portion from the first projection, to sandwich the folded portion with the first projection, and
a guide portion provided in the rear case, to guide the second projection when the front case is engaged with the rear case.

8. The impact detector according to claim 7, wherein the guide portion of the fixing member includes a tilted surface disposed at an end portion thereof facing the first projection, tilted downward toward the first projection.

9. The impact detector according to claim 7, wherein, when the case is tilted to the first side, the first arm of the planar elastic member guides the weight to the first side, and
the guide portion of the fixing member guides the weight guided by the first arm of the planer elastic member further in a predetermined direction.

10. The impact detector according to claim 9, wherein the guide portion of the fixing member includes a tilted surface disposed at an end portion thereof facing the first projection, tilted downward toward the first projection.

11. The impact detector according to claim 1, wherein the fixing member comprises a columnar member removably fixed to the case, having an irregular circumference,
the case includes an engagement portion to engage the columnar member, and
the columnar member of the fixing member is positioned at multiple predetermined angle positions in the case to change a position of the planer elastic member.

12. The impact detector according to claim 11, wherein the columnar member of the fixing member comprises multiple projections formed on the circumference thereof, each having a predetermined projection length, and
the columnar member is set at one of the multiple predetermined angle positions in the engagement portion formed in the case, at which one of the multiple projections formed on the circumference of the columnar member contacts the folded portion of the planar elastic member.

13. The impact detector according to claim 12, wherein the multiple projections of the columnar member of the fixing member comprises multiple pairs of projections facing each other,
two of the multiple projections facing each other have different length, and
a distance between edge portions of the two projections facing each other equals a distance between the first arm and the second arm.

14. The impact detector according to claim 12, wherein the engagement portion formed in the case comprises multiple locking holes provided on a circumference thereof, and
the columnar member includes a locking projection to engage one of the multiple locking holes of the engagement portion formed in the case to set the fixing member at one of the multiple predetermined angle positions.

15. The impact detector according to claim 14, wherein the multiple projections of the columnar member comprise:
a pair of spacing projections facing each other, to maintain a distance between the first arm and the second arm of the planar elastic member by contacting the first arm and the second arm of the planar elastic member, respectively; and
a pair of adjusting projections of unequal length, facing each other, one of the pair of adjusting projections is in contact with the folded portion of the planar elastic member to adjust an effective length of the first arm and the second arm of the planar elastic member.

16. The impact detector according to claim 12, wherein the planar elastic member further comprises a second arm extending from a second end portion of the folded portion opposite the first end portion from which the first arm extends, the multiple projections of the columnar member comprise:

a pair of spacing projections facing each other, to maintain a distance between the first arm and the second arm of the planar elastic member by contacting the first arm and the second arm of the planar elastic member, respectively; and a pair of adjusting projections of unequal length, facing each other, one of the pair of adjusting projections is in contact with the folded portion of the planar elastic member to adjust an effective length of the first arm and the second arm of the planar elastic member.

17. The impact detector according to claim 16, wherein the multiple projections of the columnar member of the fixing member comprises multiple pairs of projections facing each other, two of the multiple projections facing each other have different length, and a distance between edge portions of the two projections facing each other equals a distance between the first arm and the second arm.

18. The impact detector according to claim 1, wherein the sandwiching portion of the fixing member sandwiches a center potion of the folded portion of the planar elastic member.

19. A packaging container comprising:

a container in which an article is contained; and the impact detector according to claim 1.

20. An impact detector comprising:

a weight having a circular periphery;

a case in which the weight is contained, an interior of which defines a transition path through which the weight moves when the case receives an impact of a predetermined magnitude in a first direction;

a planar elastic holding means for holding the weight at an initial position in the transition path, the planar elastic holding means deforming to release the weight when the case receives the impact of the predetermined magnitude in the first direction; and a fixing means for fixing a position of the planar elastic holding means to the case and for regulating movement of the planar elastic holding means in the direction in which the weight moves.

* * * * *